US010628683B2

(12) United States Patent
Doumbouya et al.

(10) Patent No.: US 10,628,683 B2
(45) Date of Patent: Apr. 21, 2020

(54) SYSTEM AND METHOD FOR CNN LAYER SHARING

(71) Applicant: Avigilon Corporation, Vancouver (CA)

(72) Inventors: Moussa Doumbouya, Melrose, MA (US); Lu He, Woburn, MA (US); Mahesh Saptharishi, Sudbury, MA (US)

(73) Assignee: Avigilon Corporation, Vancouver (CA)

( * ) Notice: Subject to any disclaimer, the term of this patent is extended or adjusted under 35 U.S.C. 154(b) by 169 days.

(21) Appl. No.: 15/832,548

(22) Filed: Dec. 5, 2017

(65) Prior Publication Data
US 2018/0157916 A1 Jun. 7, 2018

Related U.S. Application Data

(60) Provisional application No. 62/430,307, filed on Dec. 5, 2016.

(51) Int. Cl.
G06N 3/08 (2006.01)
G06K 9/62 (2006.01)
G06N 3/04 (2006.01)
G06K 9/46 (2006.01)
G06K 9/00 (2006.01)

(52) U.S. Cl.
CPC ..... G06K 9/00771 (2013.01); G06K 9/00268 (2013.01); G06K 9/00369 (2013.01); G06K 9/00979 (2013.01); G06K 9/00986 (2013.01); G06K 9/4628 (2013.01); G06K 9/627 (2013.01); G06K 9/6262 (2013.01); G06N 3/0454 (2013.01); G06N 3/08 (2013.01); G06N 3/084 (2013.01)

(58) Field of Classification Search
CPC .... G06K 9/00744; G06K 9/46; G06K 9/4633; G06K 9/4628; G06N 3/04; G06N 3/0454; G06N 3/049
USPC ......... 382/155–159, 276, 278–281
See application file for complete search history.

(56) References Cited

U.S. PATENT DOCUMENTS

| 7,627,171 | B2 | 12/2009 | Hampshire et al. |
| 8,224,029 | B2 | 7/2012 | Saptharishi et al. |
| 8,934,709 | B2 | 1/2015 | Saptharishi et al. |
| 9,836,853 | B1 * | 12/2017 | Medioni ............ G06N 3/0445 |

(Continued)

OTHER PUBLICATIONS

International Search Report and Written Opinion dated Mar. 14, 2018, issued by the Canadian Intellectual Property Office in connection with PCT Application No. PCT/CA2017/051468, filed Dec. 5, 2017.

(Continued)

Primary Examiner — Dwayne D Bost
Assistant Examiner — Stephen M Brinich
(74) Attorney, Agent, or Firm — Daniel Hammond

(57) ABSTRACT

Methods, systems, and techniques for sharing layers between convolutional neural networks (CNNs). A data processing system may include a first and a second CNN that share a first group of layers. The first CNN may include the first group of layers in series with a second group of layers and be configured such that data for the first CNN is input to the first group of layers. The second CNN may include the first group of layers in series with a third group of layers and be configured such that data for the second CNN is also input to the first group of layers.

28 Claims, 16 Drawing Sheets

(56) References Cited

U.S. PATENT DOCUMENTS

| | | | | |
|---|---|---|---|---|
| 10,262,235 B1* | 4/2019 | Chen | ............... | G06K 9/00422 |
| 2015/0339571 A1* | 11/2015 | Krizhevsky | ............ | G06N 3/063 |
| | | | | 382/158 |
| 2016/0148079 A1* | 5/2016 | Shen | ................ | G06K 9/4628 |
| | | | | 382/157 |
| 2019/0206056 A1* | 7/2019 | Georgescu | ............ | G06T 7/0014 |

OTHER PUBLICATIONS

Eisenbach et al., "Cooperative Multi-Scale Convolutional Neural Networks for Person Detection", 2016 International Joint Conference on Neural Networks (IJCNN), Jul. 29, 2016, pp. 267-276, ISSN Electronic ISSN: 2161-4407, retrieved from the Internet: <DOI: 10.1109/IJCNN.2016.7727208; INSPEC Accession No. 16446339>.

Kuan-chuan et al., "A Framework of Extracting Multi-Scale Features Using Multiple Convolutional Neural Networks", 2015 IEEE International Conference of Multimedia and Expo (ICME), Jul. 3, 2015, pp. 1-6, retrieved from the Internet: <DOI: 10.I109/ICME.2015.7177449; Electronic ISBN: 978-1-4799-7082-7>.

Zhehuan et al., "ML-CNN: A Novel Deep Learning Based Disease Named Entity Recognition Architecture", 2016 IEEE International Conference of Bioinfrmatics and Biomedicine (BIBM), Dec. 18, 2016, pp. 794, retrieved from the Internet: <DOI: 10.1109/BIBM.2016.7822625; INSPEC Accession No. 16604331>.

LeCun, Y. et al., "Gradient-Based Learning Applied to Document Recognition", Proceedings of the IEEE, vol. 86, No. 11 (Nov. 1998), pp. 2278-2324.

Szegedy et al., "Going Deeper with Convolutions", IEEE Conference on Computer Vision and Pattern Recognition (CVPR), Jun. 7-12, 2015.

Liu, W. et al., "SSD: Single Shot MultiBox Detector", in: Leibe, B. et al., (Eds.), European Conference on Computer Vision, 2016, Part I, Lecture Notes in Computer Science 9905, pp. 21-37.

Redmon, J. et al., "You Only Look Once: Unified, Real-Time Object Detection", Proceedings of the IEEE Conference on Computer Vision and Pattern Recognition, 2016, pp. 779-788.

Bromley, Jane et al., "Signature Verification Using a 'Siamese' Time Delay Neural Network", International Journal of Pattern Recognition and Artificial Intelligence 7.04, 1993, pp. 669-688.

\* cited by examiner

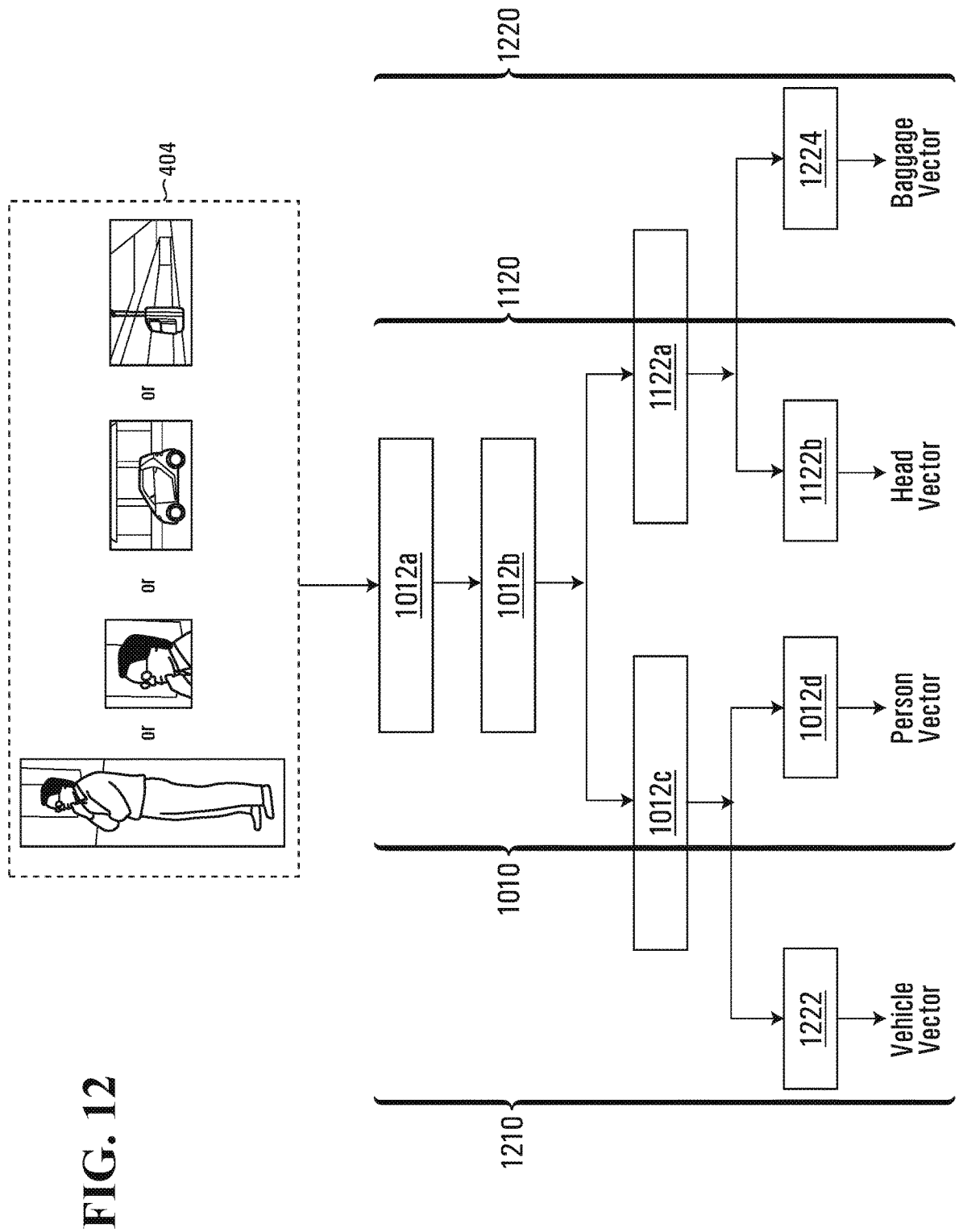

SYSTEM AND METHOD FOR CNN LAYER SHARING

CROSS-REFERENCE TO RELATED APPLICATION

This application claims the benefit of U.S. provisional patent application No. 62/430,307, filed Dec. 5, 2016, the entirety of which is hereby incorporated by reference.

TECHNICAL FIELD

The present subject-matter relates to processing data using convolutional neural networks (CNNs).

BACKGROUND

CNNs may be trained to perform various tasks on various types of data. For example, CNNs may be trained to receive data related to documents, and may be trained to perform document classification. As another example, CNNs may be trained to perform computer implemented visual object classification, which is also called object recognition. Object recognition pertains to the classifying of visual representations of real-life objects found in still images or motion videos captured by a camera. By performing visual object classification, each visual object found in the still images or motion video is classified according to its type (such as, for example, human, vehicle, or animal).

Automated security and surveillance systems typically employ video cameras or other image capturing devices or sensors to collect image data such as video or video footage. In the simplest systems, images represented by the image data are displayed for contemporaneous screening by security personnel and/or recorded for later review after a security breach. In those systems, the task of detecting and classifying visual objects of interest is performed by a human observer. A significant advance occurs when the system itself is able to perform object detection and classification, either partly or completely.

In a typical surveillance system, one may be interested in detecting objects such as humans, vehicles, animals, etc. that move through the environment. However, if for example a child is lost in a large shopping mall, it could be very time consuming for security personnel to manually review video footage for the lost child. Computer-implemented detection of objects in the images represented by the image data captured by the cameras can significantly facilitate the task of reviewing relevant video segments by the security personnel in order to find the lost child in a timely manner. For increased accuracy, different CNNs that comprise part of the surveillance system may be trained to perform different tasks (for example, one CNN may be trained to recognize humans and another CNN may be trained to recognize vehicles).

That being said, computer-implemented analysis of video to detect and recognize objects and which objects are similar requires substantial computing resources especially as the desired accuracy increases.

SUMMARY

According to a first aspect, there is provided a data processing system, comprising a first convolutional neural network (CNN) trained to perform a first task, wherein the first CNN comprises a first group of layers connected in series with a second group of layers and is configured such that data for the first CNN is input to the first group of layers; and a second CNN trained to perform a second task, wherein the second CNN comprises the first group of layers connected in series with a third group of layers and is configured such that data for the second CNN is input to the first group of layers.

The data for the first CNN may comprise a first image and the data for the second CNN may comprise a second image.

The first and the second CNNs may be configured to receive the first and the second image as part of a first batch of image data and a second batch of image data, respectively, the first batch of image data comprising the first image and the second batch of image data comprising the second image.

Each of the first and second batches of image data may comprise a four dimensional data structure.

The first and second batches of image data may be different.

The first and second batches of image data may be the same batch of images.

The first and second CNNs may be configured such that the first group of layers processes the first image and the second image, the second group of layers receives the first image after the first image has been processed by the first group of layers and not the second image after the second image has been processed by the first group of layers, and the third group of layers receives the second image after the second image has been processed by the first group of layers and not the first image after the first image has been processed by the first group of layers.

The first CNN may be configured to perform a first task comprising generating a feature vector identifying a first type of object depicted in the first image, and the second CNN may be configured to perform a second task comprising generating a feature vector identifying a second and different type of object depicted in the second image.

The system may further comprise a video capture device communicative with the first and second CNNs, wherein the video capture device is configured to generate the first and second images as portions of first and second video frames captured by the video capture device, respectively.

The video capture device may be configured to process the first and second images using the first and second CNNs, respectively.

The system may further comprise a server that is communicative with the video capture device, wherein the video capture device is configured to send the first and second images to the server, and wherein the server is configured to process the first and second images using the first and second CNNs, respectively.

According to another aspect, there is provided a data processing method, comprising processing a first batch of data using a first convolutional neural network (CNN), the first CNN comprising a first group of layers connected in series with a second group of layers, wherein the first batch of data is input to the first CNN via the first group of layers; and processing a second batch of data using a second CNN, the second CNN comprising the first group of layers connected in series with a third group of layers, wherein the second batch of data is input to the second CNN via the first group of layers.

The first batch of data may comprise a first image and the second batch of data may comprise a second image.

The first and the second CNNs may be configured to receive the first and the second image as part of a first batch of image data and a second batch of image data, respectively, the first batch of image data comprising the first image and the second batch of image data comprising the second image.

Each of the first and second batches of image data may comprise a four dimensional data structure.

The first and second batches of image data may be different.

The first and second batches of image data may be the same batch of images.

The first group of layers may process the first image and the second image, the second group of layers may receive the first image after the first image has been processed by the first group of layers and not the second image after the second image has been processed by the first group of layers, and the third group of layers may receive the second image after the second image has been processed by the first group of layers and not the first image after the first image has been processed by the first group of layers.

The first CNN may perform a first task comprising generating a feature vector identifying a first type of object depicted in the first image, and the second CNN may perform a second task comprising generating a feature vector identifying a second and different type of object depicted in the second image.

The method may further comprise capturing, at a video capture device, first and second video frames; generating, at the video capture device, the first and second images as portions of the first and second video frames, respectively; and sending the first and second images to the first group of layers.

The first and second CNNs may run on the video capture device.

The first and second images may be sent from the video capture device to a server on which the first and second CNNs run.

According to another aspect, there is provided a data processing system, comprising a processor; and a memory device having stored thereon computer program code that is executable by the processor and that, when executed by the processor, causes the processor to perform a method comprising processing a first batch of data using a first convolutional neural network (CNN), the first CNN comprising a first group of layers connected in series with a second group of layers, wherein the first batch of data is input to the first CNN via the first group of layers; and processing a second batch of data using a second CNN, the second CNN comprising the first group of layers connected in series with a third group of layers, wherein the second batch of data is input to the second CNN via the first group of layers.

The first batch of data may comprise a first image and the second batch of data may comprise a second image.

The first and the second CNNs may be configured to receive the first and the second image as part of a first batch of image data and a second batch of image data, respectively, the first batch of image data comprising the first image and the second batch of image data comprising the second image.

Each of the first and second batches of image data may comprise a four dimensional data structure.

The first and second batches of image data may be different.

The first and second batches of image data may be the same batch of images.

The first group of layers may process the first image and the second image, the second group of layers may receive the first image after the first image has been processed by the first group of layers and not the second image after the second image has been processed by the first group of layers, and the third group of layers may receive the second image after the second image has been processed by the first group of layers and not the first image after the first image has been processed by the first group of layers.

The first CNN may perform a first task comprising generating a feature vector identifying a first type of object depicted in the first image, and the second CNN may perform a second task comprising generating a feature vector identifying a second and different type of object depicted in the second image.

The system may further comprise a video capture device configured to capture first and second video frames; generate the first and second images as portions of the first and second video frames, respectively; and send the first and second images to the first group of layers.

The first and second CNNs may run on the video capture device.

The first and second images may be sent from the video capture device to a server on which the first and second CNNs run.

According to another aspect, there is provided a method for training a data processing system, the method comprising training an initial first convolutional neural network (CNN) comprising first CNN layers connected in series; training an initial second CNN comprising second CNN layers connected in series; creating a modified second CNN by replacing N of the second CNN layers from an input of the initial second CNN with M of the first CNN layers from an input of the initial first CNN, wherein N and M are positive integers; and training the modified second CNN.

The method may further comprise creating a modified first CNN by replacing X of the first CNN layers from an input of the initial first CNN with Y of the second CNN layers from an input of the initial second CNN, wherein X and Y are positive integers; and training the modified first CNN.

X and Y may be equal.

Creating the modified second CNN may be done after the training for the initial first CNN and initial second CNN is completed, and training the modified second CNN may be done without changing parameters of the initial first CNN layers comprising part of the modified second CNN.

The method may further comprise after the training of the modified second CNN, comparing accuracy of the modified second CNN to accuracy of the initial second CNN; and when the accuracy of the modified second CNN exceeds the accuracy of the initial second CNN, replacing layer M+1 to layer M+a of the modified second CNN with layer M+1 to layer M+b of the initial first CNN, wherein each of a and b is a positive integer; and then without changing parameters of the first CNN layers comprising part of the modified second CNN, training the modified second CNN. a and b may be equal, and may equal 1.

The method may further comprise after the training of the modified second CNN, comparing accuracy of the modified second CNN to accuracy of the initial second CNN; and when the accuracy of the modified second CNN exceeds the accuracy of the initial second CNN, replacing layer M to layer M−a of the modified second CNN with layer N to layer N−b of the initial second CNN, wherein each of a and b is an integer of at least zero; and then without changing parameters of the first CNN layers comprising part of the modified second CNN, training the modified second CNN. a and b may be equal, and may equal 0.

N and M may be equal.

According to another aspect, there is provided a system for training an image processing system, comprising a processor; and a memory device having stored thereon computer program code that is executable by the processor and that, when executed by the processor, causes the processor to perform a method comprising training an initial first convolutional neural network (CNN) comprising first CNN layers connected in series; training an initial second CNN comprising second CNN layers connected in series; creating a modified second CNN by replacing N of the second CNN layers from an input of the initial second CNN with M of the first CNN layers from an input of the initial first CNN, wherein N and M are positive integers; and training the modified second CNN.

The method may further comprise creating a modified first CNN by replacing X of the first CNN layers from an input of the initial first CNN with Y of the second CNN layers from an input of the initial second CNN, wherein X and Y are positive integers; and training the modified first CNN.

X and Y may be equal.

Creating the modified second CNN may be done after the training for the initial first CNN and initial second CNN is completed, and training the modified second CNN may be done without changing parameters of the initial first CNN layers comprising part of the modified second CNN.

The method may further comprise after the training of the modified second CNN, comparing accuracy of the modified second CNN to accuracy of the initial second CNN; and when the accuracy of the modified second CNN exceeds the accuracy of the initial second CNN, replacing layer M+1 to layer M+a of the modified second CNN with layer M+1 to layer M+b of the initial first CNN, wherein each of a and b is a positive integer; and then without changing parameters of the first CNN layers comprising part of the modified second CNN, training the modified second CNN. a and b may be equal, and may equal 1.

The method may further comprise after the training of the modified second CNN, comparing accuracy of the modified second CNN to accuracy of the initial second CNN; and when the accuracy of the modified second CNN exceeds the accuracy of the initial second CNN, replacing layer M to layer M−a of the modified second CNN with layer N to layer N−b of the initial second CNN, wherein each of a and b is an integer of at least zero; and then without changing parameters of the first CNN layers comprising part of the modified second CNN, training the modified second CNN. a and b may be equal, and may equal 0.

N and M may be equal.

According to another aspect, there is provided a non-transitory computer readable medium having stored thereon computer program code that is executable by the processor and that, when executed by the processor, causes the processor to perform the method of any of the foregoing aspects and suitable combinations thereof.

This summary does not necessarily describe the entire scope of all aspects. Other aspects, features and advantages will be apparent to those of ordinary skill in the art upon review of the following description of example embodiments.

BRIEF DESCRIPTION OF THE DRAWINGS

The detailed description refers to the following figures, in which:

FIG. 12 depicts four convolutional neural networks trained to perform four different tasks and that share layers with each other, according to another example embodiment;

Figure 1:
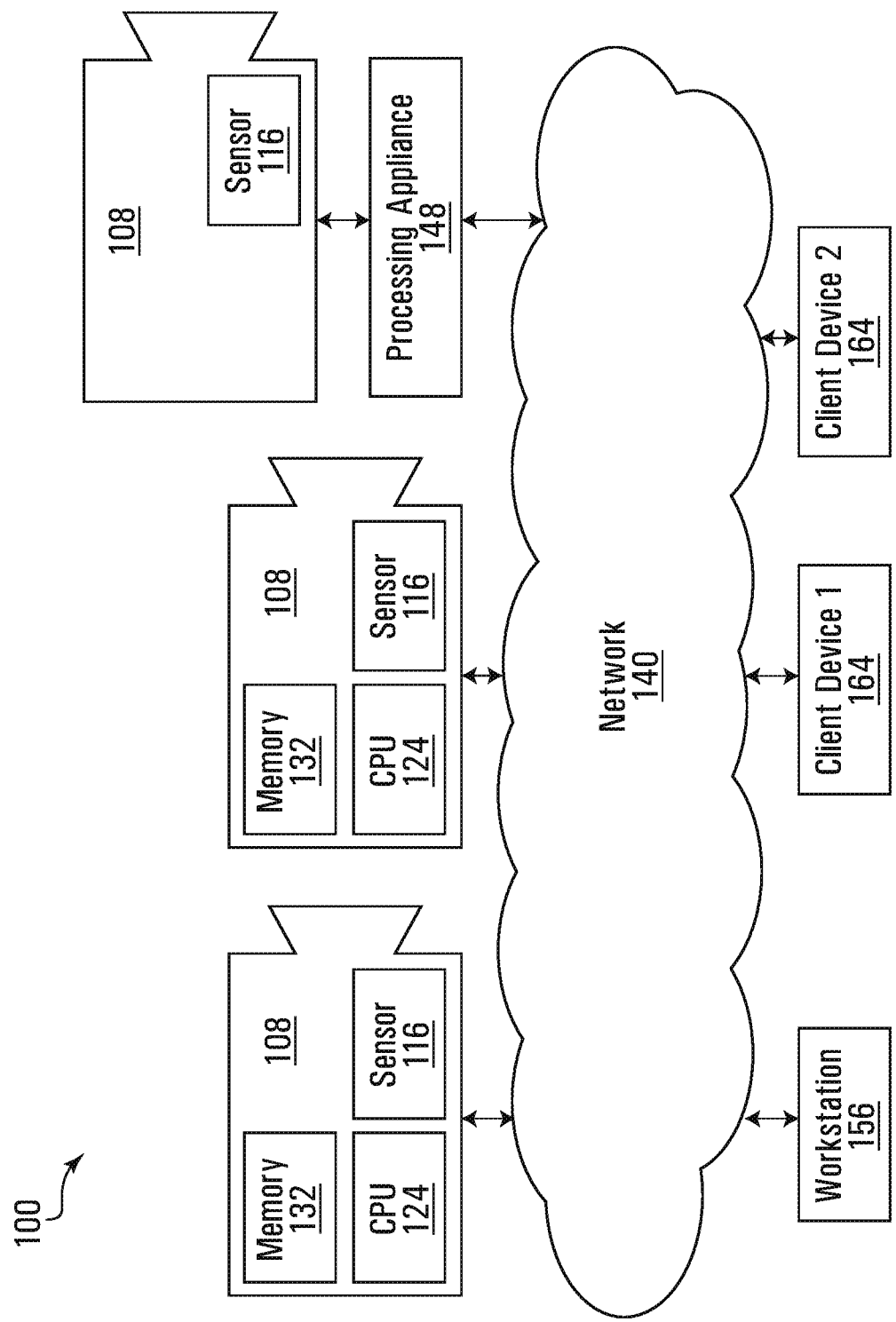
FIG. 1 illustrates a block diagram of connected devices of a video capture and playback system according to an example embodiment.

It will be appreciated that for simplicity and clarity of illustrates, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 or camera 108 is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one exemplary embodiment, and as illustrated in FIG. 1, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
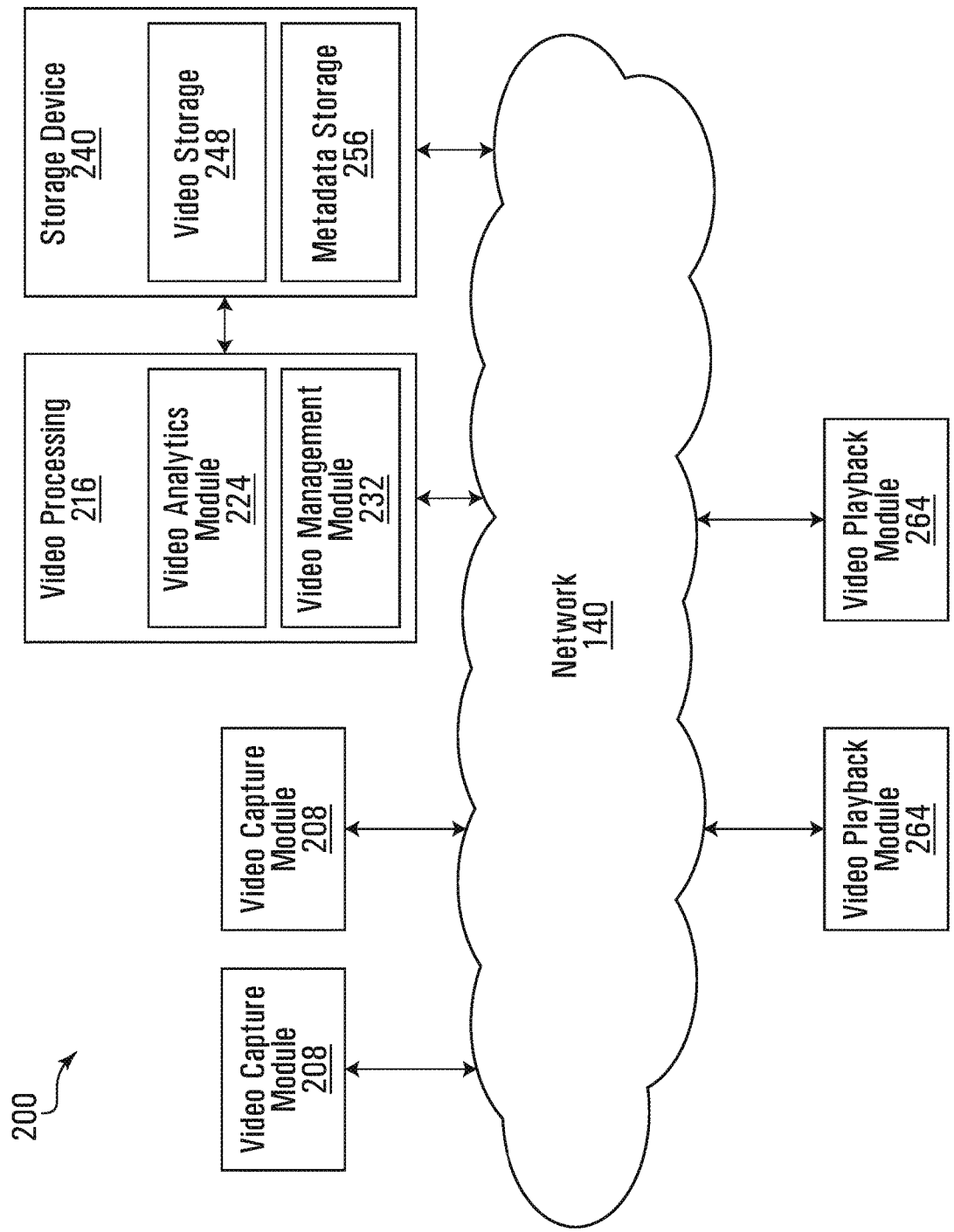
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
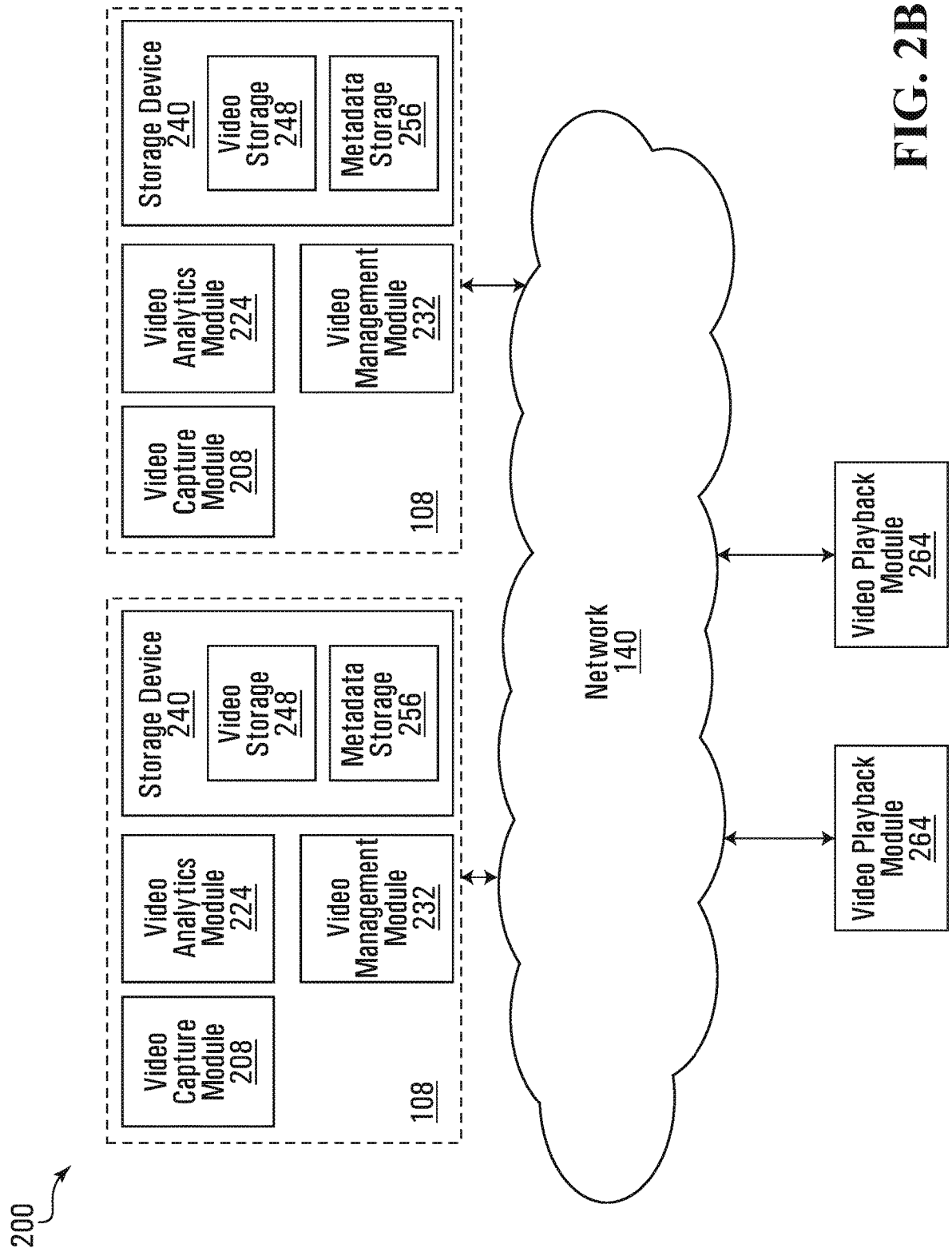
FIG. 2B illustrates a block diagram of a set of operational modules of the video capture and playback system according to one particular example embodiment wherein the video analytics module 224, the video management module 232 and the storage device 240 is wholly implemented on the one or more image capture devices 108.

Referring now to FIG. 2B, therein illustrated is a block diagram of a set 200 of operational modules of the video capture and playback system 100 according to one particular example embodiment wherein the video analytics module 224, the video management module 232 and the storage device 240 is wholly implemented on the one or more image capture devices 108. Alternatively, the video analytics module 224, the video management module 232 and the storage device 240 is wholly implemented on the processing appliance 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

Figure 3:
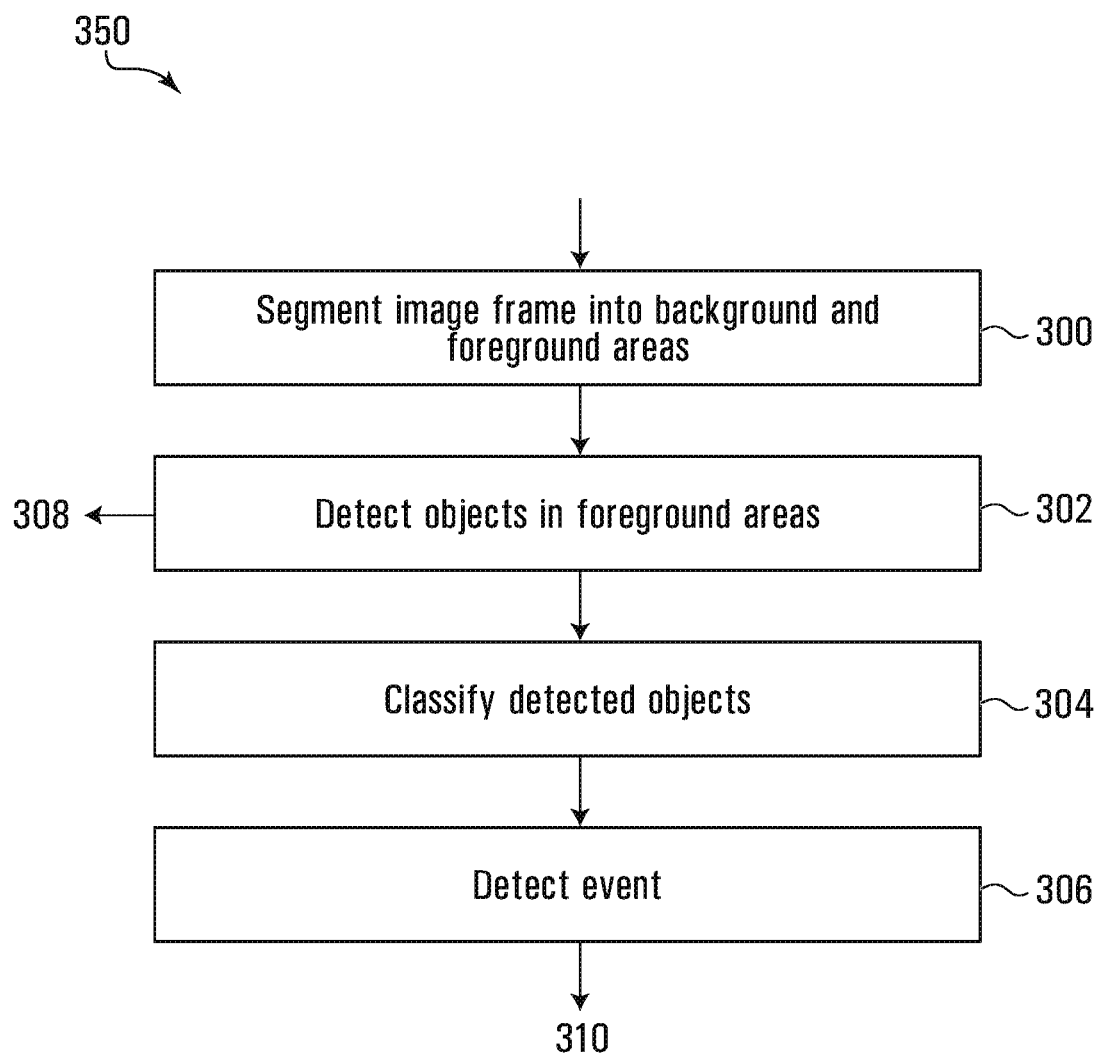
FIG. 3 illustrates a flow diagram of an example embodiment of a method for performing video analytics on one or more image frames of a video captured by a video capture device.

Referring now to FIG. 3, therein illustrated is a flow diagram of an example embodiment of a method 350 for performing video analytics on one or more image frames of a video captured by a video capture device 108. The video analytics is performed by the video analytics module 224 to determine properties or characteristics of the captured image or video and/or of visual objects found in the scene captured in the video.

At 300, at least one image frame of the video is segmented into foreground areas and background areas. The segmenting separates areas of the image frame corresponding to moving objects (or previously moving objects) in the captured scene from stationary areas of the scene.

At 302, one or more foreground visual objects in the scene represented by the image frame are detected based on the segmenting of 300. For example, any discrete contiguous foreground area or "blob" may be identified as a foreground visual object in the scene. For example, only contiguous foreground areas greater than a certain size (such as, for example, number of pixels) are identified as a foreground visual object in the scene.

Metadata may be further generated relating to the detected one or more foreground areas. The metadata may define the location, reference coordinates, of the foreground visual object, or object, within the image frame. For example, the location metadata may be further used to generate a bounding box (such as, for example, when encoding video or playing back video) outlining the detected foreground visual object. The image within the bounding box is extracted, called a "Chip", for inclusion in metadata which along with the associated video may be processed further at other devices, such as workstation 156, on the network 140. In short, the Chip is a cropped portion of an image frame of the video containing the detected foreground visual object. The extracted image, which is the Chip, alternately may be smaller then what was in the bounding box or may be larger then what was in the bounding box. The size of the image being extracted, for example, should be close to, but outside of, the actual boundaries of the object that has been detected. The bounding boxes are typically rectangular in shape.

A visual indicator may be added to the image frame to visually identify each of the detected one or more foreground visual objects. The visual indicator may be a bounding box that surrounds each of the one or more foreground visual objects within the image frame.

In some example embodiments, the video analytics may further include, at 304, classifying the foreground visual objects (or objects) detected at 302. For example, pattern recognition may be carried out to classify the foreground visual objects. A foreground visual object may be classified by class, such as a person, a car or an animal. Additionally or alternatively, a visual object may be classified by action, such as movement and direction of movement of the visual object. Other classifiers may also be determined, such as color, size, orientation, etc. In more specific examples, classifying the visual object may include identifying a person based on facial detection and recognizing text, such as a license plate. Visual classification may be performed according to systems and methods described in co-owned U.S. Pat. No. 8,934,709, which is incorporated by reference herein in its entirety.

The video analytics may further include, at 306, detecting whether an event has occurred and the type of event. Detecting the event may be based on a comparison of the classification of one or more foreground visual objects with one or more predefined rules. The event may be an event in anomaly detection or business intelligence, such as whether a video tripwire has been triggered, the number of persons present in one area, whether an object in scene has been "left behind" or whether an object in the scene has been removed.

An example of the video analytics, at 306, may be set to detect only humans and, upon such detection, extract Chips of the human objects, with reference coordinates of each of the Chips, for inclusion in metadata, which along with the associated video may be processed 310 further at other devices, such as workstation 156 on the network 140.

Figure 4:
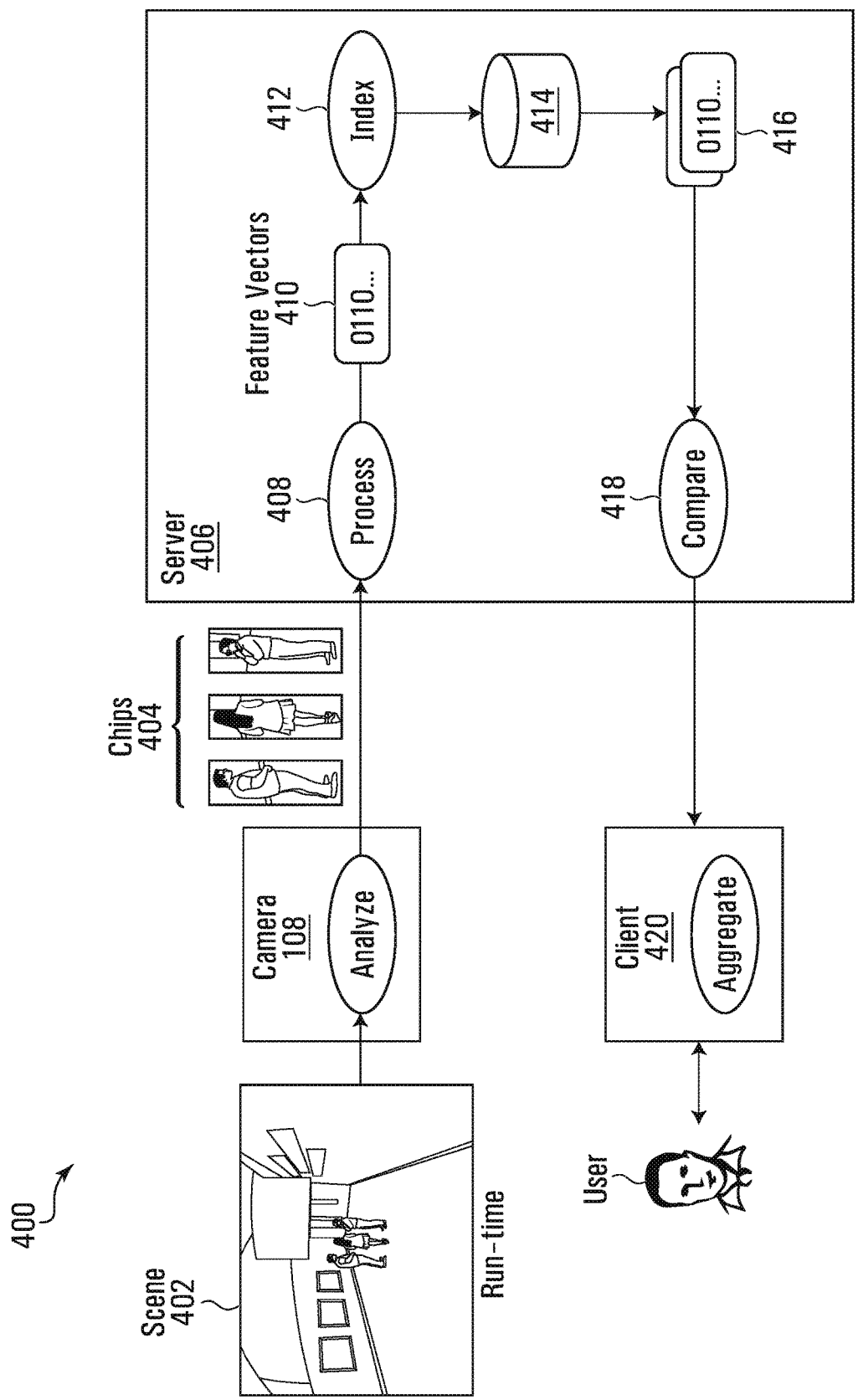
FIG. 4 illustrates a flow diagram of an example embodiment of a method for performing appearance matching to locate an object of interest on one or more image frames of a video captured by a video capture device (camera)

Referring now to FIG. 4, therein illustrated is a flow diagram of an example embodiment of a method 400 for performing appearance matching to locate an object of interest on one or more image frames of a video captured by a video capture device 108 (camera 108). The video is captured by the camera 108 over a period of time. The time could be over hours, days, or months and could be spread over several video files or segments. The meaning of "video" as used herein includes video files and video segments with associated metadata that have indications of time and identify which camera 108, in cases when there is more than one camera. The processing of the video is separated into multiple stages and distributed to optimize resource utilization and indexing for subsequent searching of objects (or persons) of interest. The video where such persons of interest are found in the search may then be reviewed by users.

Video of scene 402 is captured by the camera 108. The scene 402 is within the field of view of the camera 108. The video is processed by the video analytics module 224 in the camera 108 to produce metadata with Chips 404. The video analytics module 224 performs the object detection and classification, and also generates images (Chips) from the video that best represent the objects in the scene 402. In this example, the images of the objects, classified as people or humans, are extracted from the video and included in the metadata as Chips 404 for further identification processing. The metadata with the Chips 404 and the video are sent over the network 140 to a server 406. The server 406 may be the workstation 156 or a client device 164.

At the server 406, there are significantly more resources to further Process 408 the Chips 404 and generated Feature Vectors (or "Signatures" or "Binary Representations") 410 to represent the objects in the scene 402. The Process 408 is, for example, known in the art as a feature descriptor.

In computer vision, a feature descriptor is generally known as an algorithm that takes an image and outputs feature descriptions or feature vectors, via an image transformation. Feature descriptors encode information, i.e. an image, into a series of numbers to act as a numerical "fingerprint" that can be used to differentiate one feature from another. Ideally this information is invariant under image transformation so that the features could be found again in another image of the same object. Examples of feature descriptor algorithms are SIFT (Scale-invariant feature transform), HOG (histogram of oriented gradients), and SURF (Speeded Up Robust Features).

A feature vector is an n-dimensional vector of numerical features (numbers) that represent an image of an object that can be processed by computers. By comparing the feature vector of one image of one object with the feature vector of another image, a computer implementable process may determine whether the one image and the another image are images of the same object. The image signatures (or feature vectors, or embedding, or representation, etc.) are multi-dimensional vectors calculated by (for example convolutional) neural networks.

By calculating the Euclidean distance between the two feature vectors of the two images captured by the camera 108, a computer implementable process can determine a similarity score to indicate how similar the two images may be. The neural networks are trained in such manner that the feature vectors they compute for images are close (low Euclidian distance) for similar images and far (high Euclidian distance) for dissimilar images. In order to retrieve relevant images, the feature vector of the query image is compared with the feature vectors of the images in the database 414. The search results may be shown by ascending order of their distance (value between 0 and 1) to the query image. The similarity score may, for example, be a percentage as converted from the value between 0 and 1.

In this example implementation, the Process 408 uses a learning machine to process the Chips 404 to generate the feature vectors or signatures of the images of the objects captured in the video. The learning machine is for example a neural network such as a convolutional neural network (CNN) running on a graphics processing unit (GPU). The CNN may be trained using training datasets containing millions of pairs of similar and dissimilar images. The CNN, for example, is a Siamese network architecture trained with a contrastive loss function to train the neural networks. An example of a Siamese network is described in Bromley, Jane, et al. "Signature verification using a "Siamese" time delay neural network." International Journal of Pattern Recognition and Artificial Intelligence 7.04 (1993): 669-688, the contents of which is hereby incorporated by reference in its entirety.

The Process 408 deploys a trained model in what is known as batch learning where all of the training is done before it is used in the appearance search system. The trained model, in this embodiment, is a convolutional neural network learning model with one possible set of parameters. There is an infinity of possible sets of parameters for a given learning model. Optimization methods (such as stochastic gradient descent), and numerical gradient computation methods (such as Backpropagation) may be used to find the set of parameters that minimize our objective function (AKA loss function). Contrastive loss function is used as the objective function. This function is defined such that it takes high values when it the current trained model is less accurate (assigns high distance to similar pairs, or low distance to dissimilar pairs), and low values when the current trained model is more accurate (assigns low distance to similar pairs, and high distance to dissimilar pairs). The training process is thus reduced to a minimization problem. The process of finding the most accurate model is the training process, the resulting model with the set of parameters is the trained model and the set of parameters is not changed once it is deployed onto the appearance search system.

An alternate embodiment for Process 408 is to deploy a learning machine using what is known as online machine learning algorithms. The learning machine would be deployed in Process 408 with an initial set of parameters, however, the appearance search system will keep updating the parameters of the model based on some source of truth (for example, user feedback in the selection of the images of the objects of interest). Such learning machines also include other types of neural networks as well as convolutional neural networks.

The Chips 404 of human objects are processed by the Process 408 to generate Feature Vectors 410. The Feature Vectors 410 are Indexed 412 and stored in a database 414 with the video. The Feature Vectors 410 are also associated with reference coordinates to where the Chips 404 of the human objects may be located in the video. The database 414 storage includes storing the video with time stamps and camera identification as well as the associated metadata with the Feature Vectors 410 of the Chips 404 and reference coordinates to where in the video the Chips 404 are located.

To locate a particular person in the video, a feature vector of the person of interest is generated. Feature Vectors 416 which are similar to the feature vector of the person of interest are extracted from the database 414. The extracted Feature Vectors 416 are compared 418 to a threshold similarity score and those exceeding the threshold are provided to a client 420 for presentation to a user. The client 420 also has the video playback module 264 for the user to view the video associated with the extracted Feature Vectors 416.

In greater detail, the trained model is trained with a pre-defined distance function used to compare the computed feature vectors. The same distance function is used when the trained model is deployed in the appearance search system. The distance function is the Euclidian distance between the feature vectors where the feature vectors are normalized to have unit norms, and thus all feature vectors lie on a unit-norm hypersphere. After computing and storing the feature vectors of the detected objects in the database, searching similar objects is done using an exact nearest neighbor search: exhaustively evaluating the distance from the queried feature vector (feature vector of the object of interest) to all other vectors in the time frame of interest. The search results are returned ranked by descending order of their distance to the queried feature vector.

In an alternate embodiment, an approximate nearest neighbor search may be used. It is similar to its 'exact' counterpart, but it retrieves the most likely similar results without looking at all results. This is faster, but may introduce false negatives. An example of approximate nearest neighbor may use an indexing of a hashing of the feature vectors. An approximate nearest neighbor search may be faster where the number of feature vectors is large such as when the search time frames are long.

For greater certainty, it is understood that an "object of interest" includes a "person of interest" and that a "person of interest" includes an "object of interest".

Figure 5:
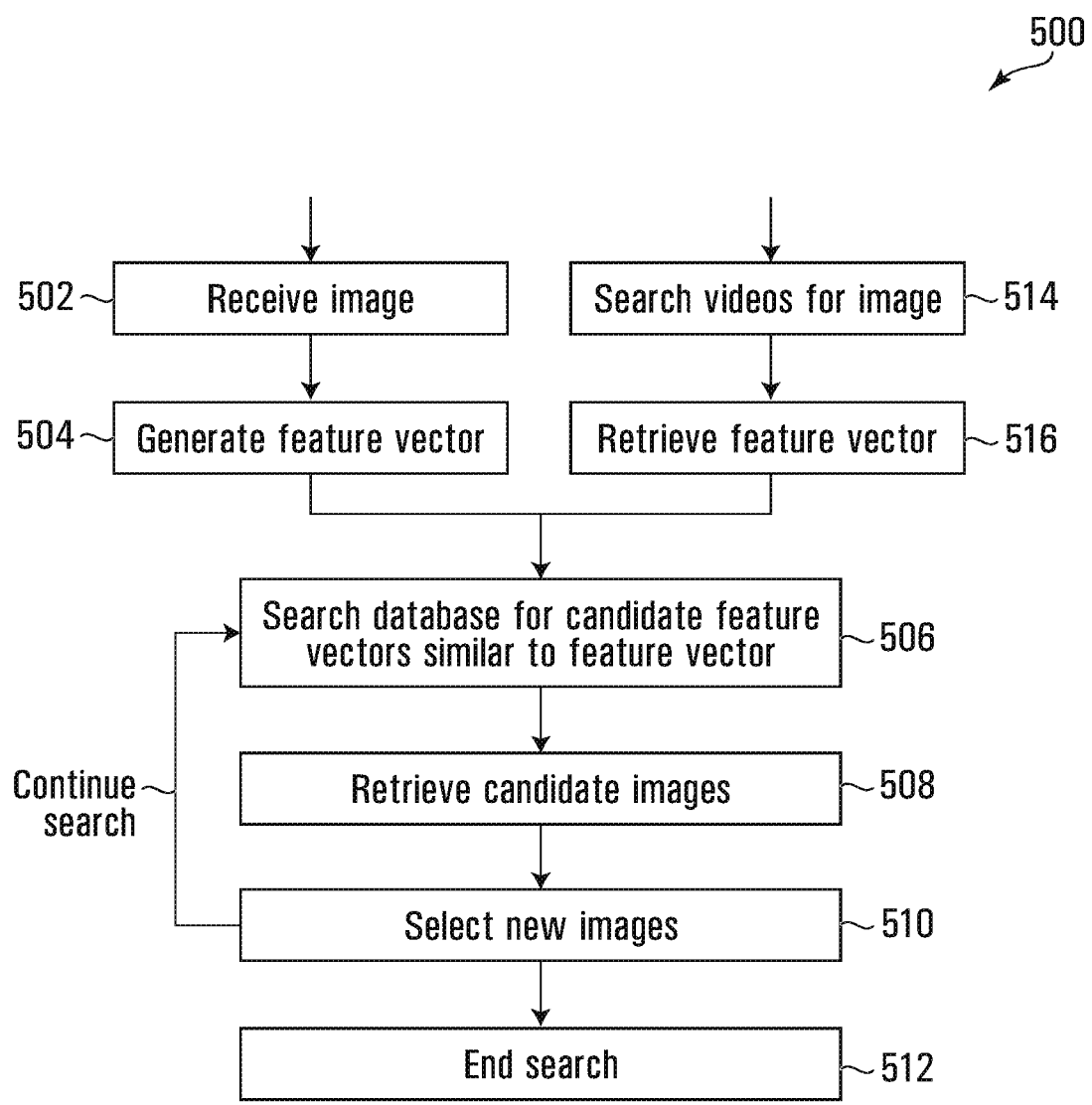
FIG. 5 illustrates a flow diagram of the example embodiment of FIG. 4 showing details of Appearance Search for performing appearance matching at the client to locate recorded videos of an object of interest.

Referring now to FIG. 5, therein illustrated is a flow diagram of the example embodiment of FIG. 4 showing details of Appearance Search 500 for performing appearance matching at the client 420 to locate recorded videos of an object of interest. To initiate an appearance search for an object of interest, a feature vector of the object of interest is needed in order to search the database 414 for similar feature vectors. In Appearance Search 500, there is illustrated two example methods of initiating an appearance search.

In the first method of initiating Appearance Search 500, an image of an object of interest is received 502 at the client 420 where it is sent to the Process 408 to generate 504 a feature vector of the object of interest. In the second method, the user searches 514 the database 414 for an image of the object of interest and retrieves 516 the feature vector of the object of interest which was previously generated when the video was processed for storage in the database 414.

From either the first method or the second method, a search 506 is then made of the database 414 for candidate feature vectors that have a similarity score, as compared with the feature vector of the object of interest, beyond a threshold, which for example could be 70%. The images of the candidate feature vectors are received 508 and then presented at the client 420 for the user to select 510 the images of the candidate features vectors which are or may be of the object of interest. The client 420 tracks the selected images in a list. The list having the images which have been selected by the user as being of the object of interest. Optionally, the user at selection 510 may also remove images, which images have been selected by the user, from the list which were subsequently thought to be incorrect.

With each selection of a new image (or images) of the object of interest at selection 510, the feature vectors of the new images is searched 506 at the database 414 and new candidate images of the object of interest are presented at the client 420 for the user to again select 510 new images which are or may be of the object of interest. This searching loop of Appearance Search 500 may continue until the user decides enough images of the object of interest has been located and ends the search 512. The user may then, for example, view or download the videos associated with the images on the list.

Figure 6:
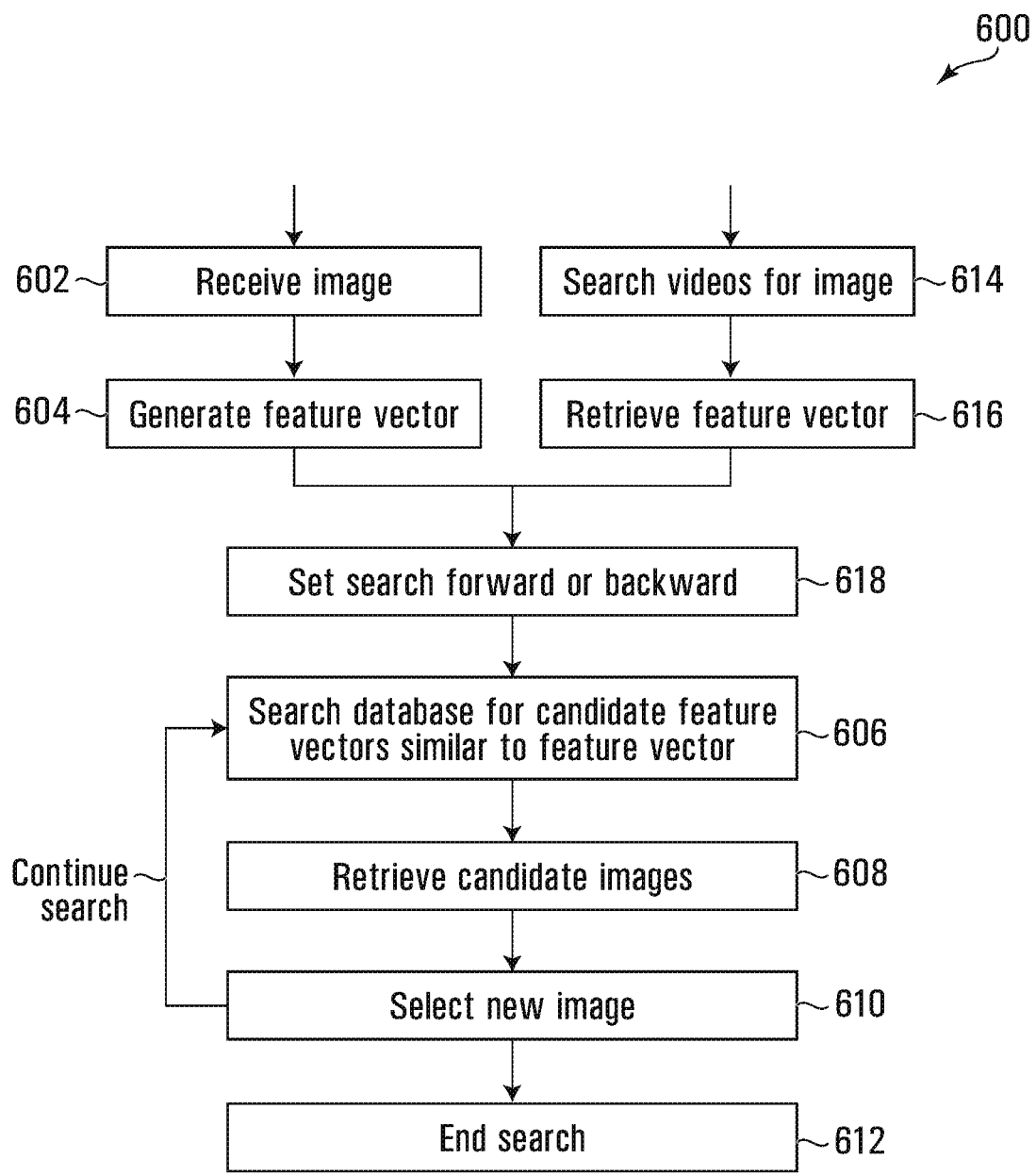
FIG. 6 illustrates a flow diagram of the example embodiment of FIG. 4 showing details of Timed Appearance Search for performing appearance matching at the client 420 to locate recorded videos of an object of interest either before or after a selected time.

Referring now to FIG. 6, therein illustrated is a flow diagram of the example embodiment of FIG. 4 showing details of Timed Appearance Search 600 for performing appearance matching at the client 420 to locate recorded videos of an object of interest either before or after a selected time. This type of search is useful for locating for example a lost bag by locating images closer to the current time and back tracking in time to locate who may have left a bag unattended.

To initial an appearance search for an object of interest, a feature vector of the object of interest is needed in order to search the database 414 for similar feature vectors. In Timed Appearance Search 600, like Appearance Search 500; there are illustrated two example methods for initiating a timed appearance search. In the first method of initiating Appearance Search 600, an image of an object of interest is received 602 at the client 420 where it is sent to the Process 408 to generate 604 a feature vector of the object of interest. In the second method, the user searches 614 the database 414 for an image of the object of interest and retrieves 616 the feature vector of the object of interest which was previously generated when the video was processed before storage in the database 414.

From either the first method or the second method, set 618 the Timed Appearance Search 600 to search either forward or backward in time. With the first method, a search time may be manually set 618 by the user at set 618. With the second method, the search start time is set 618 at the time at which the image was captured by the camera 108. In this example, this setting is set at forward in time in order to locate for example a lost child closer to the current time. In another example, this setting may be set at backward when the user wishes for instance to determine who may have left a bag (the object of interest) unattended.

A search 606 is then made of the database 414, forward in time from the search time, for candidate feature vectors that have a similarity score, as compared with the feature vector of the object of interest, beyond a threshold, which for example could be 80%. The images of the candidate feature vectors are received 608 and then presented at the client 420 for the user to select 610 one image from the images of the candidate feature vectors which is or may be of the object of interest. The client 420 tracks the selected images in a list. The list comprises the images which have been selected by the user as being of the object of interest. Optionally, the user at selection 610 may also remove images, which images have been selected by the user, from the list which were subsequently thought to be incorrect.

With each selection of a new image of the object of interest at selection 610, the feature vector of the new images is searched 606, forward in time from the search time, at the database 414. The search time is the time at which the new image was captured by the camera 108. The new candidate images of the object of interest are presented at the client 420 for the user to again select 610 another new image which are or may be of the object of interest. This searching loop of the Timed Appearance Search 600 may continue until the user decides enough images of the object of interest have been located and ends the search 612. The user may then, for example, view or download the videos associated with the images on the list. While this example is for a search forward in time, a search backward in time is accordingly similar except the searches of the database 414 are filtered for hits that are backward, or which occurred before, the search time.

Figure 7:
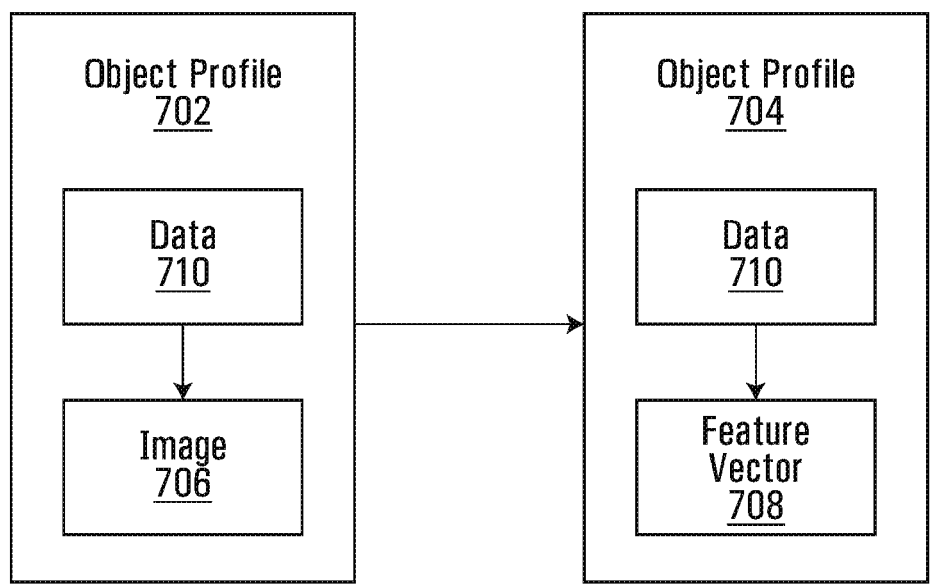
FIG. 7 illustrates block diagrams of example metadata of an Object Profile before storage and the reduced in size Object Profile for storage.

Referring now to FIG. 7, therein illustrated are block diagrams of an example metadata of an Object Profile 702 with Chip 404 as sent by the camera 108 to server 406 and an example of the Object Profile 704 with the image 706 (Chip 404) replaced by the feature vector 708 of the Chip 404 for storage in the database 414. By storing the Object Profile 704 with the feature vector 708 instead of the image 706, some storage space can be saved as the image 706 file size is bigger than the feature vector 708 file size. As a result, significant savings in data storage can be achieved, since the Chips can often be quite large and numerous.

The Data 710 in Object Profile 702 and Object Profile 704 has, for example, content including time stamp, frame number, resolution in pixels by width and height of the scene, segmentation mask of this frame by width and height in pixels and stride by row width in bytes, classification (person, vehicle, other), confidence by percent of the classification, box (bounding box surrounding the profiled object) by width and height in normalized sensor coordinates, image width and height in pixels as well as image stride (row width in bytes), segmentation mask of image, orientation, and x & y coordinates of the image box. The feature vector 708 is a binary representation (binary in the sense of being composed of zeros and ones) of the image 706 with, for example, 48 dimensions: 48 floating point numbers. The number of dimensions may be larger or smaller depending on the learning machine being used to generate the feature vectors. While higher dimensions generally have greater accuracy, the computational resources required may also be very high.

The Chip 404 or image 706 can be re-extracted from the recorded video using reference coordinates, thus the Chip 404 does not have to be saved in addition to the video. The reference coordinates may, for example, include time stamp, frame number, and box. As an example, the reference coordinates are just the time stamp with the associated video file where time stamp has sufficient accuracy to back track to the original image frame, and where the time stamp does not have sufficient accuracy to trace back to the original image frame, an image frame close to the original image frame may be good enough as image frames close in time in a video are generally very similar.

While this example embodiment has the Object Profile 704 replacing a feature vector with an image, other embodiments may have the image being compressed using conventional methods.

Figure 8:
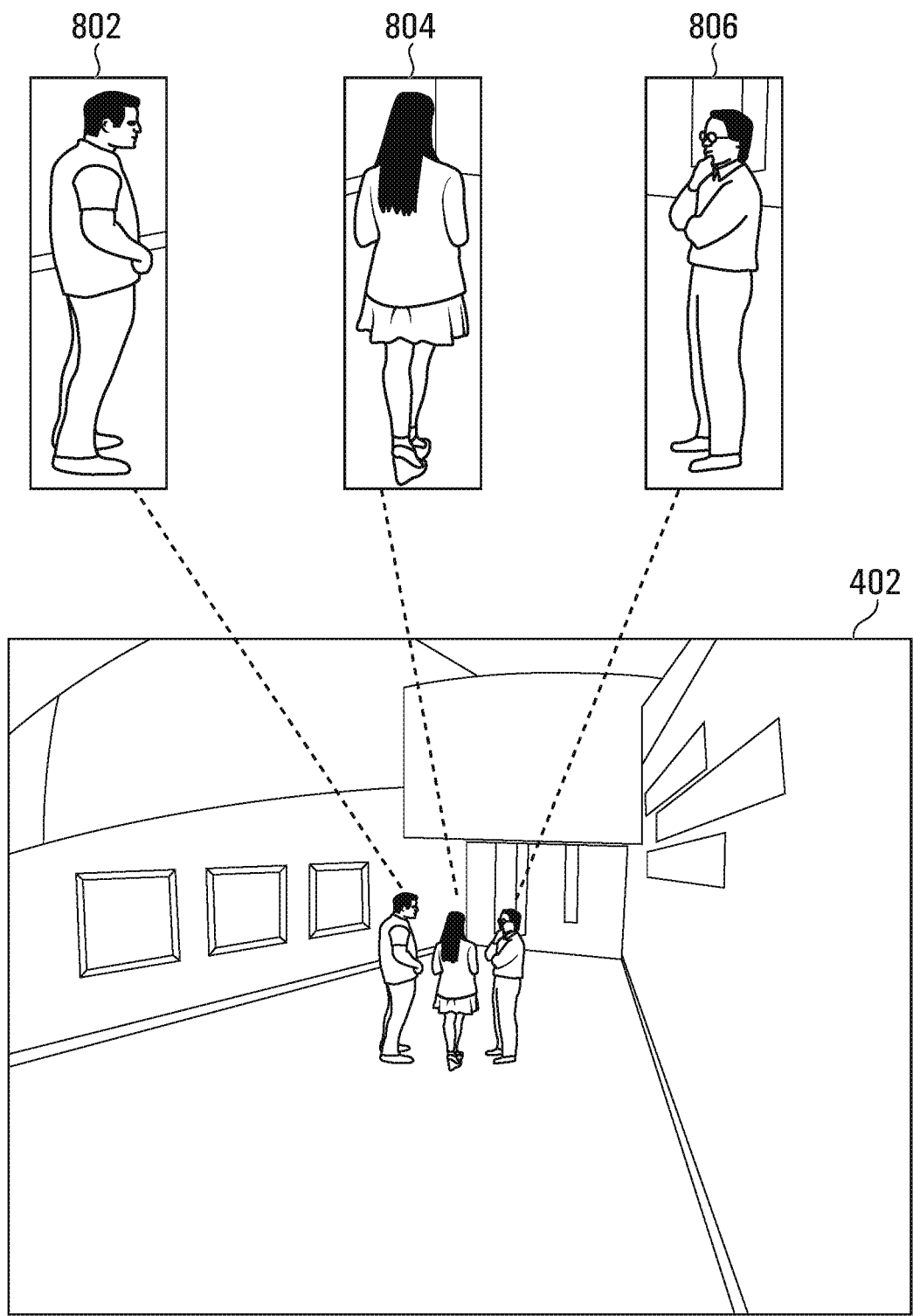
FIG. 8 illustrates the scene and the Chips of the example embodiment of FIG. 4.

Referring now to FIG. 8, therein is illustrated the scene 402 and the Chips 404 of the example embodiment of FIG. 4. There are shown in the scene 402 the three people who are detected. Their images 802, 806, 808 are extracted by the camera 108 and sent to the server 406 as the Chips 404. The images 802, 806, 808 are the representative images of the three people in the video over a period of time. The three people in the video are in motion and their captured images will accordingly be different over a given period of time. To filter the images to a manageable number, a representative image (or images) is selected as the Chips 404 for further processing.

Figure 9:
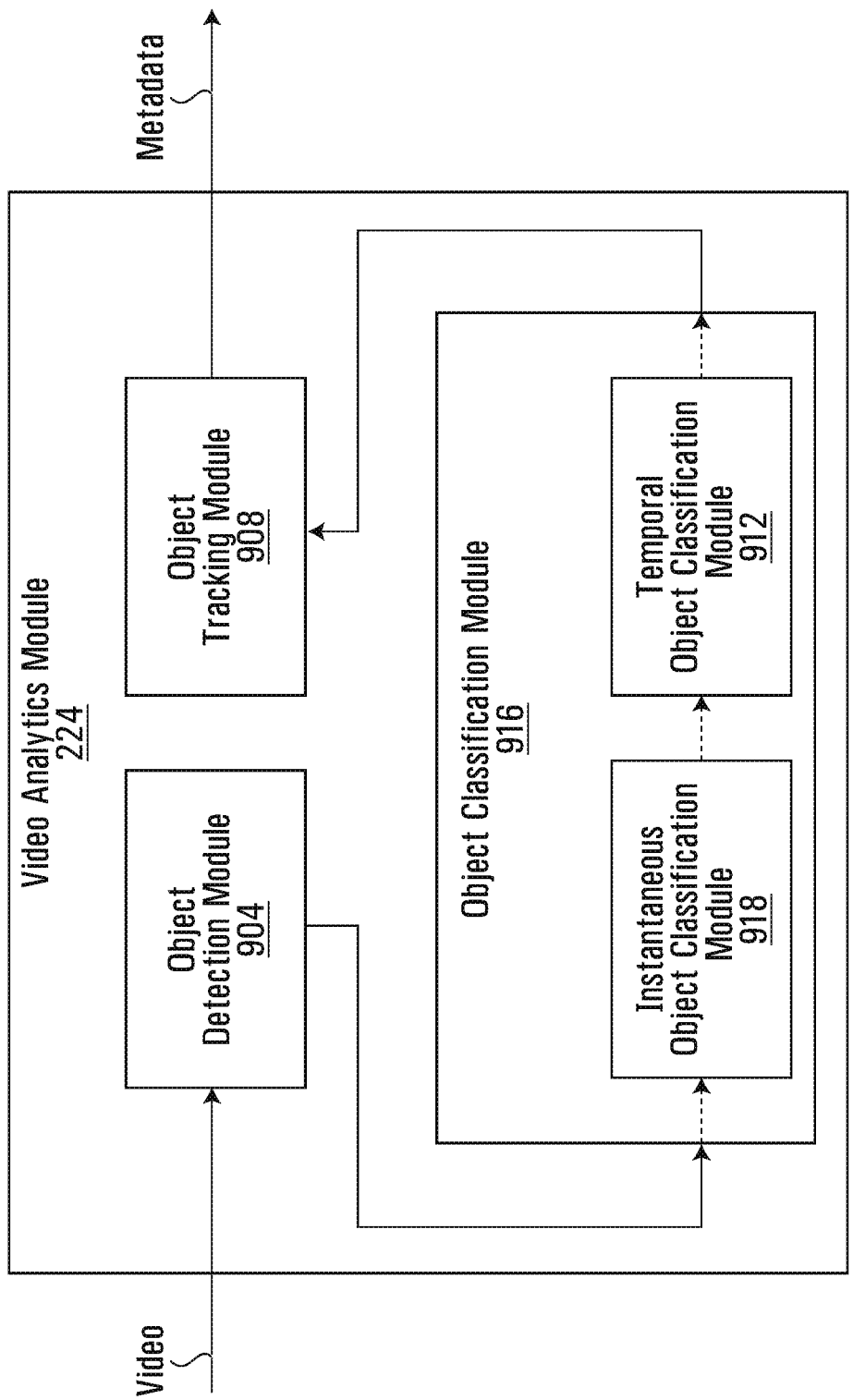
FIG. 9 illustrates a block diagram of a set of operational sub-modules of the video analytics module according to one example embodiment.

Referring now to FIG. 9, therein illustrated is a block diagram of a set of operational sub-modules of the video analytics module 224 according to one example embodiment. The video analytics module 224 includes a number of modules for performing various tasks. For example, the video analytics module 224 includes an object detection module 904 for detecting objects appearing in the field of view of the video capturing device 108. The object detection module 904 may employ any known object detection method such as motion detection and blob detection, for example. The object detection module 904 may include the systems and use the detection methods described in U.S. Pat. No. 7,627,171 entitled "Methods and Systems for Detecting Objects of Interest in Spatio-Temporal Signals," the entire contents of which is incorporated herein by reference.

The video analytics module 224 also includes an object tracking module 908 connected or coupled to the object detection module 904. The object tracking module 908 is operable to temporally associate instances of an object detected by the object detection module 908. The object tracking module 908 may include the systems and use the methods described in U.S. Pat. No. 8,224,029 entitled "Object Matching for Tracking, Indexing, and Search," the entire contents of which is incorporated herein by reference. The object tracking module 908 generates metadata corresponding to visual objects it tracks. The metadata may correspond to signatures of the visual object representing the object's appearance or other features. The metadata is transmitted to the server 406 for processing.

The video analytics module 224 also includes an object classification module 916 which classifies detected objects from the object detection module 904 and connects to the object tracking module 908. The object classification module 916 may include internally, an instantaneous object classification module 918 and a temporal object classification module 912. The instantaneous object classification module 918 determines a visual object's type (such as, for example, human, vehicle, or animal) based upon a single instance of the object. The input to the instantaneous object classification module 916 is preferably a sub-region (for example within a bounding box) of an image in which the visual object of interest is located rather than the entire image frame. A benefit of inputting a sub-region of the image frame to the classification module 916 is that the whole scene need not be analyzed for classification, thereby requiring less processing power. The video analytics module 224 may, for example, filter out all object types except human for further processing.

The temporal object classification module 912 may also maintains class (such as, for example, human, vehicle, or animal) information of an object over a period of time. The temporal object classification module 912 averages the instantaneous class information of the object provided by the instantaneous object classification module 918 over a period of time during the lifetime of the object. In other words, the temporal object classification module 912 determines the objects type based on its appearance in multiple frames. For example, gait analysis of the way a person walks can be useful to classify a person, or analysis of a person's legs can be useful to classify a cyclist. The temporal object classification module 912 may combine information regarding the trajectory of an object (such as, for example, whether the trajectory is smooth or chaotic, or whether the object is moving or motionless) and confidence information of the classifications made by the instantaneous object classification module 918 averaged over multiple frames. For example, classification confidence values determined by the object classification module 916 may be adjusted based on the smoothness of trajectory of the object. The temporal object classification module 912 may assign an object to an unknown class until the visual object is classified by the instantaneous object classification module 918 a sufficient number of times and a predetermined number of statistics have been gathered. In classifying an object, the temporal object classification module 912 may also take into account how long the object has been in the field of view. The temporal object classification module 912 may make a final determination about the class of an object based on the information described above. The temporal object classification module 912 may also use a hysteresis approach for changing the class of an object. More specifically, a threshold may be set for transitioning the classification of an object from unknown to a definite class, and that threshold may be larger than a threshold for the opposite transition (such as, for example, from a human to unknown). The object classification module 916 may generate metadata related to the class of an object, and the metadata may be stored in the database 414. The temporal object classification module 912 may aggregate the classifications made by the instantaneous object classification module 918.

In an alternative arrangement, the object classification module 916 is placed after the object detection module 904 and before the object tracking module 908 so that object classification occurs before object tracking. In another alternative arrangement, the object detection, tracking, temporal classification, and classification modules 904, 908, 912, and 916 are interrelated as described above. In a further alternative embodiment, the video analytics module 224 may use facial recognition (as is known in the art) to detect faces in the images of humans and accordingly provides confidence levels. The appearance search system of such an embodiment may include using feature vectors of the images or Chips of the faces instead of the whole human as shown in FIG. 8. Such facial feature vectors may be used alone or in conjunction with feature vectors of the whole object. Further, feature vectors of parts of objects may similarly be used alone or in conjunction with feature vectors of the whole object. For example, a part of an object may be an image of an ear of a human. Ear recognition to identify individuals is known in the art.

In each image frame of a video, the video analytics module 224 detects the objects and extracts the images of each object. An image selected from these images is referred to as a finalization of the object. The finalizations of the objects are intended to select the best representation of the visual appearance of each object during its lifetime in the scene. A finalization is used to extract a signature/feature vector which can further be used to query other finalizations to retrieve the closest match in an appearance search setting.

The finalization of the object can ideally be generated on every single frame of the object's lifetime. If this is done, then the computation requirements may be too high for appearance search to be currently practical as there are many image frames in even one second of video. The following is an example of filtering of possible finalizations, or the selection of an image from possible images, of an object to represent the object over a period of time in order to reduce computational requirements.

As an Object (a human) enters the scene 402, it is detected by the object detection module 904 as an object. The object classification module 916 would then classify the Object as a human or person with a confidence level for the object to be a human. The Object is tracked in the scene 402 by the object tracking module 908 through each of the image frames of the video captured by the camera 108. The Object may also be identified by a track number as it is being tracked.

In each image frame, an image of the Object within a bounding box surrounding the Object is extracted from the image frame and the image is a Chip. The object classification module 916 provides a confidence level for the Object as being a human for each image frame, for example. The video analytics module 224 keeps a list of the top 10 chips with highest confidence levels as the Object is tracked in the scene 402. When the object tracking module 908 loses track of the Object or when the Object exits the scene, the Chip 404 is selected from the list of 10 chips which shows the Object with the largest number of foreground pixels (or object pixels). The Chip 404 is sent with the metadata to the server 406 for further processing. The Chip 404 represents the image of the Object over this tracked period of time. The confidence levels are used to reject chips which may not represent a good picture of the Object such as when the Object crosses a shadow. Alternatively, more than one chip may be picked from the list of top 10 chips for sending to the server 406. For example, another chip selected by the highest confidence level may be sent as well.

The list of the top 10 Chips is one implementation. Alternatively, the list could be only 5 Chips or 20 Chips as further examples. Further, the selection of a Chip for sending as the Chip 404 from the list of Chips may occur periodically instead of just after the loss of tracking. Alternatively, the Chip selection from the list may be based on the highest confidence level instead of on the largest number of object pixels. Alternatively, the video analytics module 224 may be located at the server 406 (the workstation 156), the processing appliance 148, the client device 164, or at other devices off the camera.

The Chip selection criterion mentioned above are possible solutions to the problem of representing an objects lifetime by a single Chip. Below is another selection criteria.

Alternatively, filtration of the top 10 of n Chips can be performed by using the information provided by a height estimation algorithm of the object classification module 916. The height estimation module creates a homology matrix based on head (top) and foot (bottom) locations observed over a period of time. The period of learning the homology is hereby referred to as a learning phase. The resulting homology is further used to estimate the height of a true object appearing at a particular location and is compared with the observed height of an object at that location. Once the learning is complete, the information provided by the height estimation module can be used to filter out Chips in the top n list by comparing the heights of the Chips with the expected height of an object at the location where the Chip was captured. This filtering method is intended to be a rejection criterion of Chips which may be false positives with high confidence reported by the object classification module 916. The resulting filtered Chips can then be further ranked by the number of foreground pixels captured by the object. This multi-stage filtration criteria ensures that not only does the finalization of the object have high classification confidence, but is also conformant to the dimensions of the expected object at its location and furthermore, also has a good number of foreground pixels as reported by the object detection module 904. The resulting Chip from the multi-stage filtration criteria may better represent the appearance of the object during its lifetime in the frame as compared to a Chip that results from any of the above mentioned criteria applied singularly. The machine learning module herein includes machine learning algorithms as is known in the art.

Figure 10:
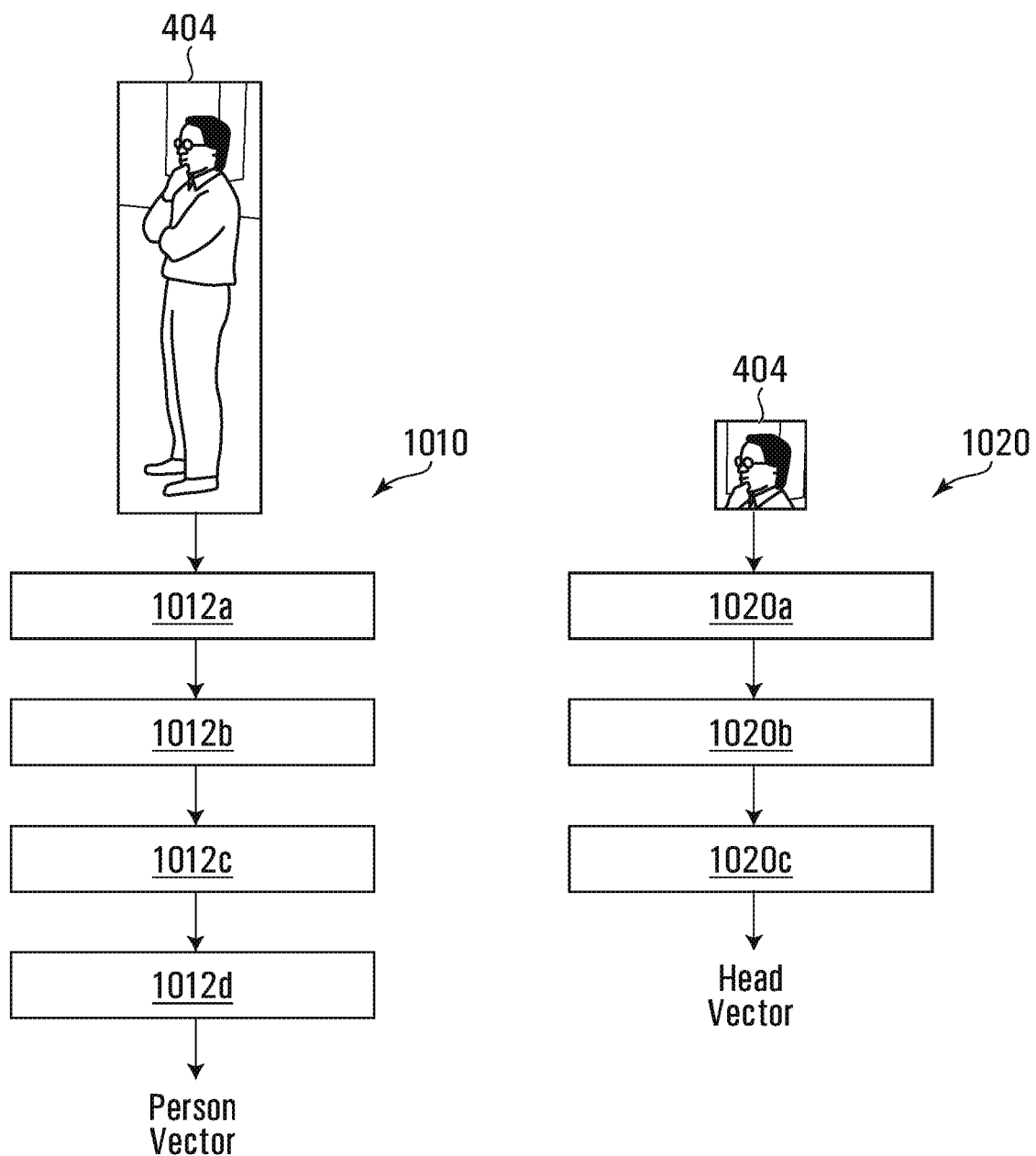
FIG. 10 depicts a pair of learning machines comprising one convolutional neural network trained to output a feature vector for a person and another convolutional neural network trained to output a feature vector for a head, according to another example embodiment.

FIGS. 10-12 depict example embodiments of layer sharing between at least two CNNs. In at least those example embodiments, a first CNN is trained to perform a first task and a second CNN is trained to perform a second task. The first CNN comprises a first group of layers connected in series with a second group of layers and is configured such that data for the first CNN is input to the first group of layers. The second CNN comprises the first group of layers connected in series with a third group of layers and is configured such that data for the second CNN is input to the first group of layers. In this way, the first and second CNNs share the first group of layers, thereby saving computational resources, such as memory, in contrast to conventional CNNs in which the first and second CNNs are distinct. For computer vision applications in particular, the convolutional layers nearer to the input of a CNN may in at least some example embodiments generally be used as low-level feature detectors and accordingly may be more suitable for sharing than convolutional layers farther from the input, which may be directed at higher level features.

In FIGS. 10-12, the CNNs are depicted as processing images and as being trained to perform feature vector generation. However, in at least some different example embodiments (not depicted), one or more of the CNNs that share layers with each other may accept non-image data, be used for different types of tasks, or both. For example, even in embodiments in which the CNNs are trained to process images, they may be trained to perform tasks different from feature vector generation, such as object classification and detection. The CNNs may also be trained to receive non-image data and, consequently, to performs tasks other than image processing. For example, one or more of the CNNs may receive data from any suitable type of sensor, such as an audio sensor, sonar sensor, or radar sensor; financial market data; time series or frequency domain data; and document data. The tasks that the CNNs are trained to perform may accordingly vary as well. For example, in an example embodiment in which one of the CNNs is trained to receive document data, that CNN may be trained to perform document classification. In at least some example embodiments, the CNNs that share layers may be trained to receive different types of data (e.g., one CNN may be trained to receive audio data while the other is trained to receive image data) and accordingly perform different types of tasks, despite sharing one or more layers.

Referring now to FIG. 10, there are depicted a pair of learning machines in the form of a person vector CNN 1010 and a first head vector CNN 1020, according to another example embodiment. The CNNs 1010,1020 are used in the depicted example embodiment to process chips 404 generated by the camera 108. The person vector CNN 1010 processes chips 404 of entire persons ("person chips 404"), as depicted in FIG. 4, while the head vector CNN 1020 processes chips 404 of heads of persons ("head chips 404"). In at least some example embodiments, the person and head vector CNNs 1010,1020 both run on the server 408; however, in at least some different example embodiments, one or both of those CNNs 1010,1020 may alternatively run on the camera 108. The person vector CNN 1010 is trained with people image datasets to generate feature vectors identifying whole persons ("person vectors"), and accordingly outputs those feature vectors in response to processing the person chips 404. The head vector CNN 1010 is trained with head image datasets to generate feature vectors identifying persons' heads ("head vectors"), and accordingly outputs feature vectors identifying only heads in response to processing the head chips 404.

As the person vector CNN 1010 is trained specifically to generate person vectors using person chips 404 and the head vector CNN 1020 is trained specifically to generate head vectors using head chips 404, the accuracy of the person and head chips 404 generated by the person and head vector CNNs 1010,1020, respectively, is higher in at least some embodiments than the person and head vectors generated by a single CNN trained to generate both types of vectors. In the context of feature vectors, "accuracy" means that the Euclidian distance between a pair of person and head feature vectors generated for two similar images generated by one of the person and head vector CNNs 1010,1020, respectively, is smaller than the Euclidean distance between the analogous vectors generated by a single CNN trained to generate both types of vectors.

CNNs having one or both of various architectures and different parameters may be used in different example embodiments. For example, the LeNet5 CNN (see, e.g., "Gradient-Based Learning Applied to Document Recognition", Yann LeCun, Leon Bottou, Yoshua Bengio, and Patrick Haffner, *Proc. of the IEEE*, November 1998) and GoogLeNet CNN ("Going Deeper with Convolutions", Christian Szegedy, Wei Liu, Yangqing Jia, Pierre Sermanet, Scott Reed, Dragomir Anguelov, Dumitru Erhan, Vincent Vanhoucke, Andrew Rabinovich, *Computer Vision and Pattern Recognition (CVPR)*, 2015) may be used in at least some example embodiments.

As shown in FIG. 10, CNNs comprise various layers connected in series. As used herein, layer N of a CNN, where N is an integer of at least one, refers to the number of layers from the input of the CNN, which receives the image. Multiple layers may be connected in parallel and consequently receive the image concurrently. For example, the first layer of a CNN, which receives the input image prior to all other layers, has N=1. The person vector CNN 1010 comprises first through fourth layers 1012$a$-$d$, while the head vector CNN comprises first through third layers 1020$a$-$c$. The layers 1012$a$-$d$,1020$a$-$c$ may comprise, for example, convolutional layers, pooling layers, activation layers, or other types of suitable layers. A CNN comprises at least one convolutional layer in which a convolution operation is performed on data input to that layer. CNN layers may also comprise any one or more of, for example, pooling or sub-sampling layers, fully-connected layers used for image classification, and layers that apply functions such as the Softmax function and non-linearity operations (e.g., ReLU). The GoogLeNet CNN, for example, has 22 layers that use parameters that may be varied with training (e.g., convolutional and fully-connected layers), and 27 layers when also including those layers that do not use parameters that may be varied with training (e.g., pooling layers).

In at least the depicted example embodiments, a "layer" of a CNN comprises any computational block that performs a single type of computational operation performed by that CNN. For example, each of the layers 1012$a$-$d$,1020$a$-$c$ may comprise, for example, a single convolutional block that performs a single type of convolutional operation on the data it receives, a single pooling block that performs a single type of pooling on data input to it, or some other operation to be performed on input data, such as a Softmax or rectification (ReLU) operation. In at least some different embodiments (not depicted) in which a CNN comprises several computational blocks in parallel (i.e., those computational blocks concurrently receive the same data for processing), those blocks in parallel may collectively comprise a single layer. Additionally or alternatively, in at least some different embodiments in which several computational blocks are connected in series, a continuous subset of those blocks may be comprise a single layer. For example, a continuous two or more convolutional blocks in series may be treated as a single layer; analogously, a convolutional block immediately followed by a pooling block that performs a max pooling operation on data that that convolutional block outputs may be treated as a single layer.

In at least the depicted example embodiments, the data that is input to the CNNs 1010,1020 is stored as a multidimensional array having a rank of four. Each instance of that data structure represents a batch, or collection, of images and has parameters [n, k, h, w], where n is the number of images represented by the data structure, k is the number of channels for each of the images, h is the height in pixels of each of the channels, and w is the width in pixels of each of the channels. Each of the layers of the CNNs accepts an instance of that data structure as input, and outputs an instance of that data structure. In at least some different embodiments, the data may be stored in a different suitable type of data structure, such as a multidimensional array having a different rank. The four-dimensional array may similarly be used with non-image data in example embodiments in which the CNNs are trained to perform tasks with non-image data.

Training CNNs for a particular task such as object classification comprises performing many iterations with training images, with each iteration referred to as an "epoch", to iteratively determine and refine the parameters of each of the layers such that sufficient and preferably optimal CNN performance results. Each epoch comprises performing a process of forward pass, loss function, backward pass, and parameter update. Training comprises repeating a number of epochs for each set of training images (commonly called a batch).

Figure 11A:
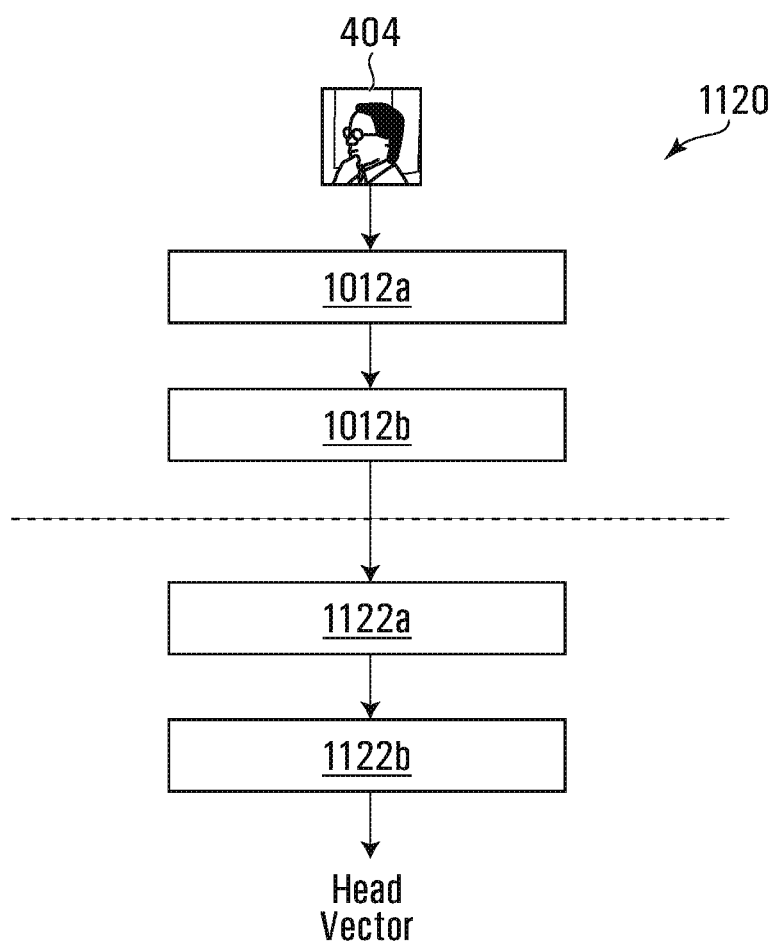
FIG. 11A depicts a convolutional neural network trained to output a feature vector for a head, that uses two layers of the convolutional neural network of FIG. 10 that is trained to output a feature vector for a person, according to another example embodiment.

In certain example embodiments, layers may be shared between different CNNs. FIG. 11A, for example, depicts a second head vector CNN 1120 comprising four layers 1012*a,b* and 1122*a,b*. The first two layers 1012*a,b* of the second head vector CNN 1120 are the first two layers 1012*a,b* of the person vector CNN 1010, while the third and fourth layers 1122*a,b* of the second head vector CNN 1120 are specific to the second head vector CNN 1120. In order to arrive at the second head vector CNN 1120, the parameters of the first two layers 1012*a,b* of the person vector CNN 1010 are frozen; the first two layers 1012*a,b* are combined with the third and fourth layers 1122*a,b* in untrained form to create the second head vector CNN 1120 prior to training; and the second head vector CNN 1120 is then trained so as to refine the parameters of the third and fourth layers 1122*a,b*. Following training, a head chip 404 may be input to the second head vector CNN 1120 to generate a head vector.

Figure 11B:
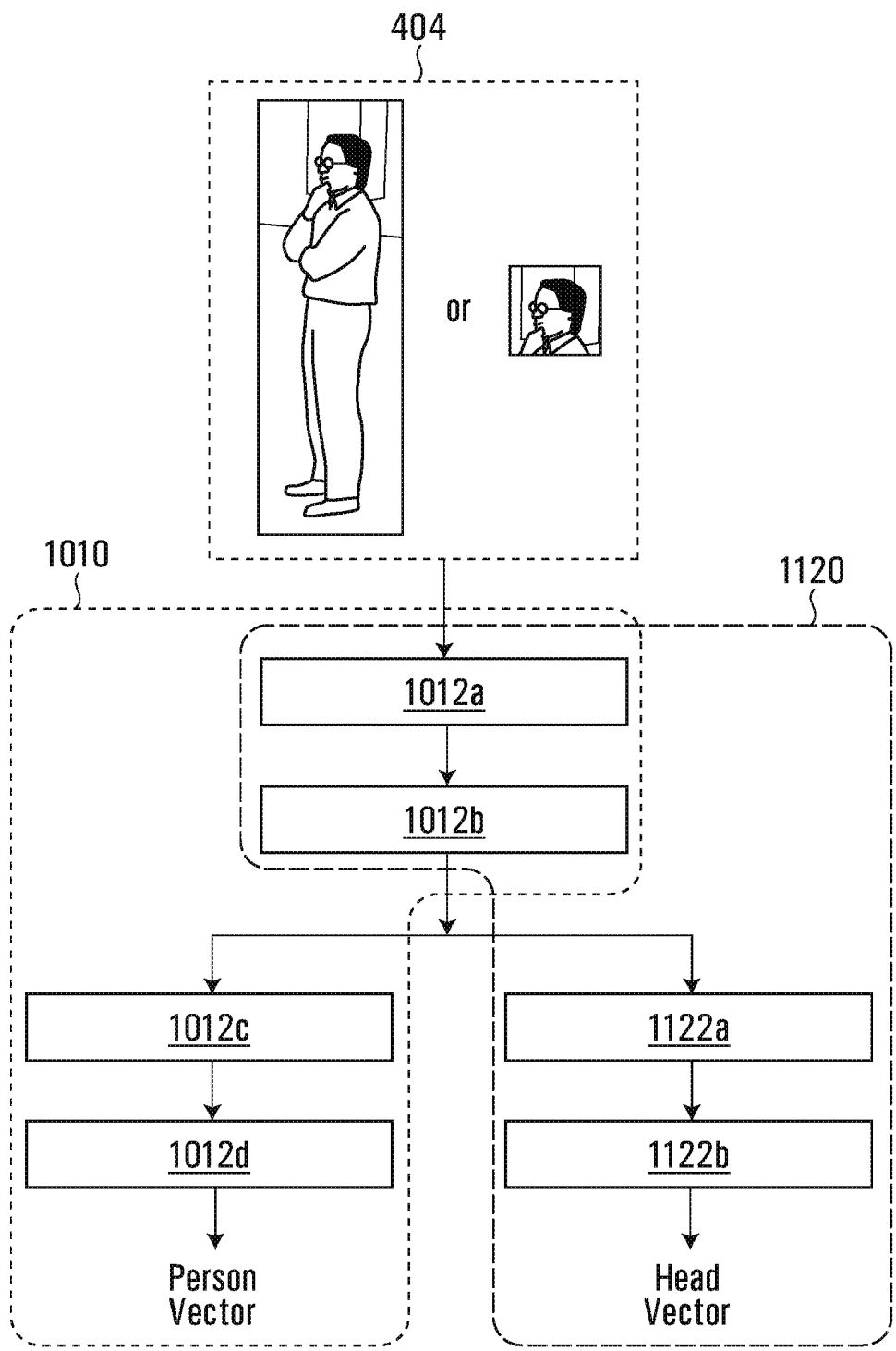
FIG. 11B depicts two convolutional neural networks trained to perform two different tasks and that share layers with each other, according to another example embodiment.

Referring to FIG. 11B, there is shown an example embodiment in which the person vector CNN 1010 and the second head vector CNN 1120 are both implemented and share their first two layers 1012*a,b*. Consequently, the first two layers 1012*a,b* are not duplicated and computational resources, such as memory, are saved on the server 406 as opposed to an embodiment where the CNNs 1010,1120 are separately implemented. A chip 404 is processed only once by the first two layers 1012*a,b*; the output from the second layer 1012*b* is used by the person vector CNN 1010 (when the chip 404 is a person chip 404) at its third and fourth layers 1012*c,d*, and by the second head vector CNN 1120 (when the chip is a head chip 404) at its third and fourth layers 1122*a,b*. Consequently, the embodiment of FIG. 11B can be used to generate a person vector (when the person chip 404 is input to and processed by the person vector CNN 1010) and a head vector (when the head chip 404 is input to and processed by the second head vector CNN 1120). In this manner, the video capture and playback system 100 may also be used to search for a person based on a head shot of the person, which may be used as the head chip 404, such as a passport photograph.

In at least some example embodiments, the CNNs 1010, 1120 of FIG. 11B receive as input a batch of chips 404 in the four-dimensional array data structure described above. For example, the CNNs 1010,1120 may receive a batch of 100 images for processing by the first two layers 1012*a,b*, in which case n=100, of which 50 are person chips 404 and 50 are head chips 404. The first two layers 1012*a,b* process the entire batch of images and outputs two of the four-dimensional arrays of n=50; one of the output arrays comprises the results of processing the 50 person chips 404, while the other of the output arrays comprises the results of processing the 50 head chips 404. The array comprising the data for the 50 person chips 404 is sent to the third and fourth layers 1012*c,d* of the person vector CNN 1010 for further processing, while the array comprising the data for the 50 head chips 404 is sent to the third and fourth layers 1122*a,b* of the head vector CNN 1120 for further processing.

In at least some additional example embodiments, the batch of chips 404 input to the first two layers 1012*a,b* of the CNNs 1010,1120 of FIG. 11B may comprise only a single type of chip 404. For example, the four-dimensional array may comprise only head chips 404. In this example embodiment, the first two layers 1012*a,b* process the entire batch of head chips 404 and the output of the second layer 1012*b* is sent only to the third layer 1122*a* of the second head vector CNN 1120 for further processing. Computational resources are accordingly not wasted by having the person vector CNN 1010 process head chips 404.

The example embodiment of FIG. 11B is an example of the process 408 performing only two tasks: outputting a person vector, and outputting a head vector. Referring now to FIG. 12, additional layers 1210*a* and 1220*a* are added to the embodiment of FIG. 11B such that the embodiment of FIG. 12 is configured to generate not only person and head vectors, but vehicle and baggage vectors as well.

In FIG. 12, the person vector CNN 1010 and the second head vector CNN 1120 are present as they are in FIG. 11B. The embodiment of FIG. 12 also comprises a vehicle vector CNN 1210, which shares the first three layers 1012*a-c* of the person vector CNN 1010 and feeds the output of the third layer 1012*c* to a fourth layer 1222 specific to the vehicle vector CNN 1210. To train the fourth layer 1222 of the vehicle vector CNN 1210, the parameters of the first three layers 1012*a-c* of the person vector CNN 1010 are frozen; those first three layers 1012*a-c* are combined with the fourth layer 1222 specific to the vehicle vector CNN 1210 in untrained form to create the vehicle vector CNN 1210 prior to training; and the vehicle vector CNN 1210 is then trained so as to refine the parameters of the fourth layer 1222. Following training, the vehicle vector CNN 1222 outputs a vehicle vector in response to input of a chip of a vehicle, as shown in FIG. 12.

Also shown in FIG. 12 is a baggage vector CNN 1220, which shares the first three layers 1012*a,b*, and 1122 of the second head vector CNN 1120 and feeds the output of the third layer 1122*a* to a fourth layer 1224 specific to the baggage vector CNN 1220. To train the fourth layer 1224 of the baggage vector CNN 1220, the parameters of the first three layers 1012*a,b* and 1122 of the second head vector CNN 1010 are frozen; those first three layers 1012*a,b* and 1122 are combined with the fourth layer 1224 specific to the baggage vector CNN 1220 in untrained form to create the baggage vector CNN 1220 prior to training; and the baggage vector CNN 1220 is then trained so as to refine the parameters of the fourth layer 1224. Following training, the baggage vector CNN 1220 outputs a baggage vector in response to input of a chip of baggage, as shown in FIG. 12.

While FIG. 12 shows two layers 1012*a,b* being shared between all four CNNs 1010,1120,1210,1220, three layers 1012*a-c* being shared between the vehicle vector and person vector CNNs 1210,1010, and three layers 1012*a,b* and 1122*a* being shared between the second head vector and baggage vector CNNs 1120,1220, in different embodiments (not depicted) any suitable number of layers may be shared between any suitable number of CNNs. For example, multiple CNNs may share one or more layers with one or more other CNNs, with the shared layers operating at different positions within the different CNNs. The CNNs 1010,1120, 1210,1220 of FIG. 12 may process one or more batches of image data analogously as described for FIG. 11B. For example, in at least one example embodiment, a batch of images stored as a four-dimensional array may be input to the first layer 1012*a*. In this example, n may equal 200, divided between 50 person chips 404, 50 face chips 404, 50 vehicle chips 404, and 50 baggage chips 404. The first two layers 1012*a,b* process all 200 chips, and the second layer 1012*b* outputs two four-dimensional arrays, each with n=100: a first array for sending to the third layer 1012*c* of the vehicle vector CNN 1210 and person vector CNN 1010 comprising processed data for the 50 vehicle chips 404 and the 50 person chips 404; and a second array for sending to the third layer 1122*a* of the second head vector CNN 1120 and the baggage vector CNN 1220 comprising processed data for the 50 head chips 404 and 50 baggage chips 404. The third layer 1012*c* of the vehicle and person vector CNNs 1210,1010 processes the array it receives from the second layer 1012b and outputs two four-dimensional arrays each with n=50: a first array comprising only the vehicle chip 404 data for sending to the fourth layer 1222 of the vehicle vector CNN 1210 and a second array comprising only the person chip 404 data for sending to the fourth layer 1012 of the person vector CNN 1010. The third layer 1122a of the second head and baggage vector CNNs 1120,1220 processes the array it receives from the second layer 1012b and analogously outputs two four-dimensional arrays each with n=50: a first array comprising only the head chip 404 data for sending to the fourth layer 1122b of the second head vector CNN 1120 and a second array comprising only the baggage chip 404 data for sending to the fourth layer 1224 of the baggage vector CNN 1220. The fourth layers 1222, 1012d,1122b,1224 of the CNNs 1210,1010,1120,1220 consequently receive data specific to the types of vectors they are trained to output, and process and output those vectors.

Figure 13:
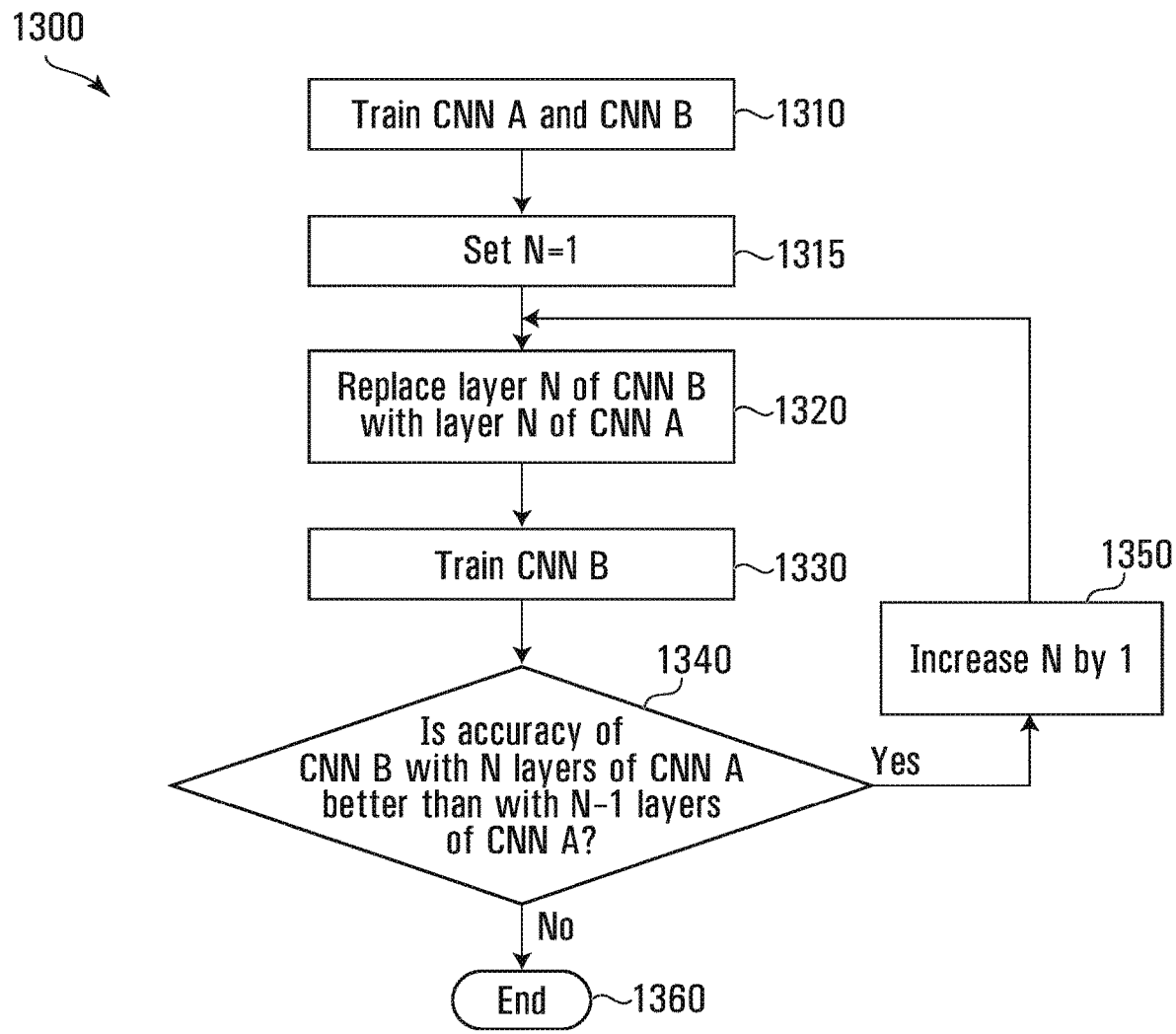
FIG. 13 depicts a flow diagram of a method for determining the number of layers of a first convolutional neural network to share with a second convolutional neural network, according to another example embodiment.

Referring now to FIG. 13, there is shown a flow diagram 1300 of an example embodiment of a method to determine the number of layers of a first CNN to share with a second CNN. Initially, the first CNN (CNN A) is trained for Task 1, which may be, for example, generating a person vector; and the second CNN (CNN B) is trained for Task 2, which may be, for example, generating a head vector (block 1310). An index, N, for representing a particular layer of CNNs A and B is then initialized to 1 (block 1315). The first layer (N=1) of CNN B is then replaced with the first layer (N=1) of CNN A (block 1320). CNN B with its first layer replaced with the first layer of CNN A is then trained for Task 2 (block 1330) without changing the parameters of the first layer of CNN A that comprises part of CNN B. The accuracy of CNN B with the first layer of CNN A, which is determined as part of training, is compared to the accuracy of CNN B without any layers of CNN A (block 1340). If the accuracy of CNN B with the first layer of CNN A is higher than without it, N is increased by one (block 1350), and the method returns to block 1320 to iteratively determine whether sharing another layer (block 1320) will further increase accuracy through re-training (block 1330) and re-testing (block 1340). If accuracy is not higher with some or additional layer sharing, the method ends at block 1360. In the context of the example embodiment of FIG. 4, Task 1 may be generating a person vector and Task 2 may be generating a vehicle vector.

The example embodiment of FIG. 13 is one example of a more general example method that comprises training an initial first CNN (such as CNN A) comprising first CNN layers connected in series, and training an initial second CNN (such as CNN B) comprising second CNN layers connected in series. As in FIG. 13, "training" comprises determining accuracy of a CNN. This more general example method also comprises creating a modified second CNN by replacing the first N layers of the initial second CNN with the first M layers of the initial first CNN, with N and M being positive integers. Subsequently, the modified second CNN is trained and, as part of that training, its accuracy is assessed and may be compared relative to the accuracy of the initial second CNN. When accuracy of the second CNN increases with more layers of the initial first CNN than fewer layers, additional layers from the initial first CNN may replace layers in the modified second CNN, and testing may iteratively proceed in a manner analogous to that described in respect of FIG. 13 to determine how many layers from the initial first CNN can be used in the second CNN without prejudicing accuracy.

While in FIG. 13, N is increased by 1 for each testing iteration, more generally for each iteration another a layers of the modified second CNN may be replaced with another b layers of the initial first CNN, with each of a and b being positive integers and, in the example embodiment of FIG. 13, both equaling 1. Additionally, in at least some example embodiments, N may be decreased, instead of increased, for each testing iteration. For example, in an example embodiment in which the modified second CNN is created by replacing its first N layers with M layers of the initial first CNN, on a subsequent iteration, layer M to layer M−a of the modified second CNN may be replaced with layer N to layer N−b of the initial second CNN, where each of a and b is an integer of at least zero and, in at least one example embodiment, each of a and b equals 0.

In the foregoing example embodiments, the layers of the first CNN are trained and, once used in the second CNN, frozen; that is, the parameters of the layers of the first CNN remain unchanged during training of the second CNN. However, in at least some different example embodiments, the parameters of the first CNN that are used in the modified second CNN may be permitted to change. This is an example of "end-to-end" training.

In some example embodiments that implement end-to-end training, the first and second CNNs may be concurrently trained. In addition to creating a modified second CNN as described above, a modified first CNN may be analogously created and concurrently trained with the modified second CNN. For example, in at least some example embodiments, a modified first CNN may be created by replacing the first X layers of the initial first CNN with the first Y layers of the initial second CNN, with X and Y both being positive integers. The modified first CNN may then be iteratively trained analogously as the modified second CNN.

In at least some example embodiments, M=N, which results in the same number of layers being removed from the initial second CNN as used from the initial first CNN. Similarly, in at least some example embodiments, X=Y, which results in the same number of layers being removed from the initial first CNN as used from the initial second CNN.

Figure 14:
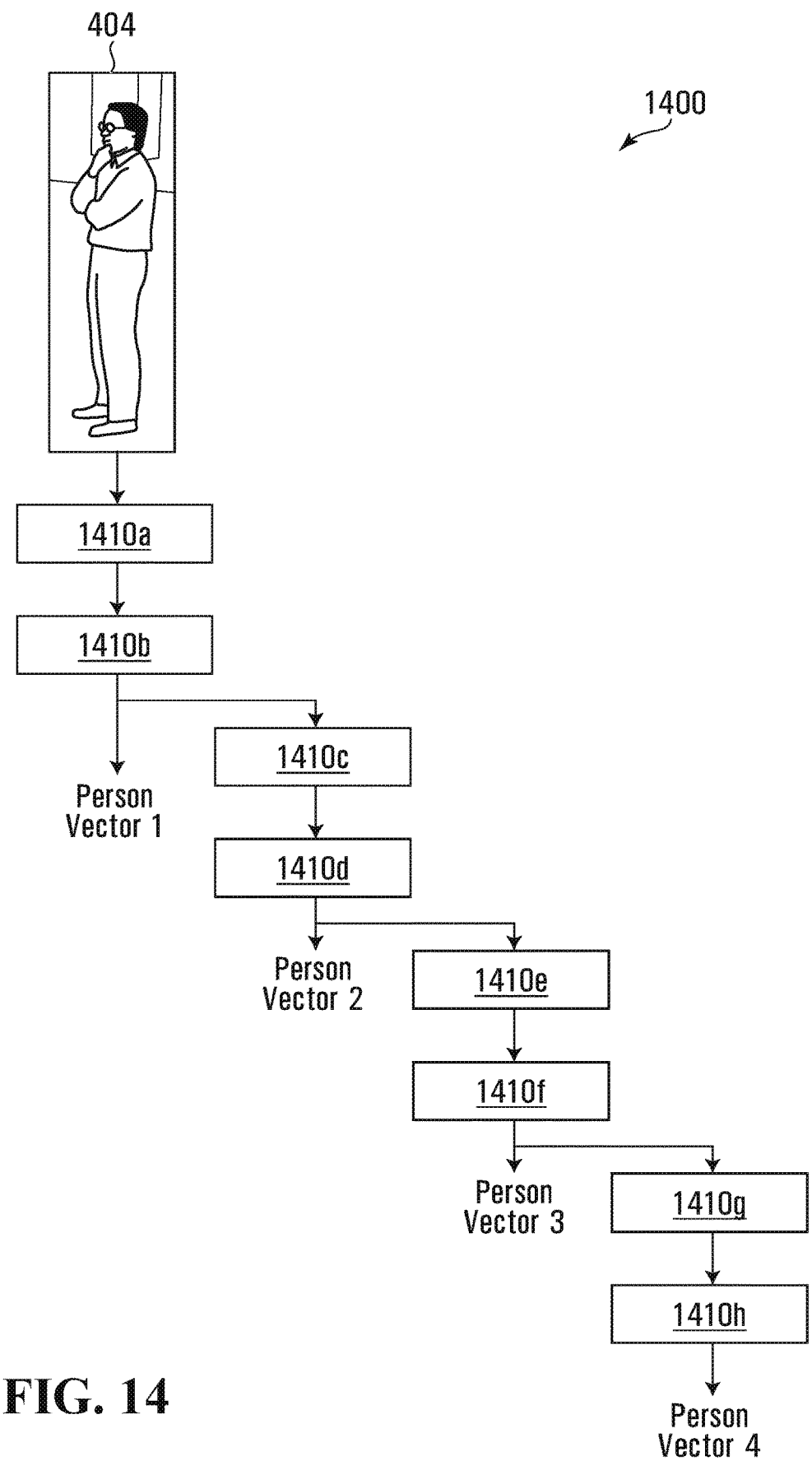
FIG. 14 depicts a convolutional neural network according to another example embodiment in which different feature vectors of differing accuracies are generated.

Referring now to FIG. 14, there is illustrated a CNN 1400 comprising first through eighth layers 1410a-h. The first through eighth layers 1410a-h are connected in series, and the CNN 1400 outputs at the second, fourth, sixth, and eighth layers 1410b,d,f,h first through fourth person vectors, respectively, with person vectors output from deeper layers of the CNN 1400 benefiting from more processing and therefore being more accurate than person vectors output from earlier layers of the CNN 1400. During training of the CNN 1400, the accuracy of each of the first through fourth person vectors may be assessed and compared to required accuracy when the CNN 1400 is deployed. When the additional accuracy resulting from additional layers is determined to be unnecessary for runtime, the layers required for that additional accuracy may be culled from the CNN 1400 prior to deployment. For example, if it is determined during training that the second person vector, which is output from the fourth layer 1410d, is sufficiently accurate for deployment, the fourth through eighth layers 1410e-h may be culled prior to deploying the CNN 1400. This helps to save computational resources, which may be limited, when the CNN 1400 is deployed.

Layers may be shared between any suitable types of CNN. For example, layers may be shared between CNNs trained as a CNN detector that finds the location of an object-of-interest in an image. Examples of CNN detectors include a "single-shot detector" and a "you only look once" detector, as described in Liu, Wei, Dragomir Anguelov, Dumitru Erhan, Christian Szegedy, Scott Reed, Cheng-Yang Fu, and Alexander C. Berg, "SSD: Single Shot MultiBox Detector" in European Conference on Computer Vision, pp. 21-37, and Springer, Cham, 2016 and Redmon, Joseph, Santosh Divvala, Ross Girshick, and Ali Farhadi, "You Only Look Once: Unified, Real-time Object Detection" in Proceedings of the IEEE Conference on Computer Vision and Pattern Recognition, pp. 779-788. 2016, respectively.

It will be appreciated that the underlying methodology of extracting chips from objects, computing a feature vector representation from them and furthermore, using this feature vector as a basis to compare against feature vectors from other objects, is agnostic of the class of the object under consideration. A specimen object could include a bag, a backpack or a suitcase. An appearance search system to locates vehicles, animals, and inanimate objects may accordingly be implemented using the features and/or functions as described herein without departing from the spirit and principles of operation of the described embodiments.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A data processing system, comprising:
 a first convolutional neural network (CNN) trained to perform a first task, wherein the first CNN comprises a first group of layers connected in series with a second group of layers and is configured such that data for the first CNN is input to the first group of layers; and
 a second CNN trained to perform a second task, wherein the second CNN comprises the first group of layers connected in series with a third group of layers and is configured such that data for the second CNN is input to the first group of layers,
wherein the data for the first CNN comprises a first image and the data for the second CNN comprises a second image, and
wherein the first CNN is configured to perform a first task comprising generating a feature vector identifying a first type of object depicted in the first image, and the second CNN is configured to perform a second task comprising generating a feature vector identifying a second and different type of object depicted in the second image.

2. The system of claim 1, wherein the first and the second CNNs are configured to receive the first and the second image as part of a first batch of image data and a second batch of image data, respectively, the first batch of image data comprising the first image and the second batch of image data comprising the second image.

3. The system of claim 2, wherein each of the first and second batches of image data comprises a four dimensional data structure.

4. The system of claim 2, wherein the first and second batches of image data are different.

5. The system of claim 2, wherein the first and second batches of image data are the same batch of images.

6. The system of claim 5, wherein the first and second CNNs are configured such that the first group of layers processes the first image and the second image, the second group of layers receives the first image after the first image has been processed by the first group of layers and not the second image after the second image has been processed by the first group of layers, and the third group of layers receives the second image after the second image has been processed by the first group of layers and not the first image after the first image has been processed by the first group of layers.

7. The system of claim 1, further comprising a video capture device communicative with the first and second CNNs, wherein the video capture device is configured to generate the first and second images as portions of first and second video frames captured by the video capture device, respectively.

8. The system of claim 7, wherein the video capture device is configured to process the first and second images using the first and second CNNs, respectively.

9. The system of claim 7, further comprising a server that is communicative with the video capture device, wherein the video capture device is configured to send the first and second images to the server, and wherein the server is configured to process the first and second images using the first and second CNNs, respectively.

10. A data processing method, comprising:
 processing a first batch of data using a first convolutional neural network (CNN), the first CNN comprising a first group of layers connected in series with a second group of layers, wherein the first batch of data is input to the first CNN via the first group of layers; and
 processing a second batch of data using a second CNN, the second CNN comprising the first group of layers connected in series with a third group of layers, wherein the second batch of data is input to the second CNN via the first group of layers,
wherein the first batch of data comprises a first image and the second batch of data comprises a second image, and
wherein the first CNN performs a first task comprising generating a feature vector identifying a first type of object depicted in the first image, and the second CNN performs a second task comprising generating a feature vector identifying a second and different type of object depicted in the second image.

11. The method of claim 10, wherein the first and the second CNNs are configured to receive the first and the second image as part of a first batch of image data and a second batch of image data, respectively, the first batch of image data comprising the first image and the second batch of image data comprising the second image.

12. The method of claim 11, wherein each of the first and second batches of image data comprises a four dimensional data structure.

13. The method of claim 11, wherein the first and second batches of image data are different.

14. The method of claim 11, wherein the first and second batches of image data are the same batch of images.

15. The method of claim 14, wherein the first group of layers processes the first image and the second image, the second group of layers receives the first image after the first image has been processed by the first group of layers and not the second image after the second image has been processed by the first group of layers, and the third group of layers receives the second image after the second image has been processed by the first group of layers and not the first image after the first image has been processed by the first group of layers.

16. The method of claim 10, further comprising:
capturing, at a video capture device, first and second video frames;
generating, at the video capture device, the first and second images as portions of the first and second video frames, respectively; and
sending the first and second images to the first group of layers.

17. The method of claim 16, wherein the first and second CNNs run on the video capture device.

18. The method of claim 16, wherein the first and second images are sent from the video capture device to a server on which the first and second CNNs run.

19. A data processing system, comprising:
a processor; and
a memory device having stored thereon computer program code that is executable by the processor and that, when executed by the processor, causes the processor to perform a method comprising:
processing a first batch of data using a first convolutional neural network (CNN), the first CNN comprising a first group of layers connected in series with a second group of layers, wherein the first batch of data is input to the first CNN via the first group of layers; and
processing a second batch of data using a second CNN, the second CNN comprising the first group of layers connected in series with a third group of layers, wherein the second batch of data is input to the second CNN via the first group of layers,
wherein the first batch of data comprises a first image and the second batch of data comprises a second image, and
wherein the first CNN performs a first task comprising generating a feature vector identifying a first type of object depicted in the first image, and the second CNN performs a second task comprising generating a feature vector identifying a second and different type of object depicted in the second image.

20. The system of claim 19, wherein the first and the second CNNs are configured to receive the first and the second image as part of a first batch of image data and a second batch of image data, respectively, the first batch of image data comprising the first image and the second batch of image data comprising the second image.

21. The system of claim 20, wherein each of the first and second batches of image data comprises a four dimensional data structure.

22. The system of claim 20, wherein the first and second batches of image data are different.

23. The system of claim 20, wherein the first and second batches of image data are the same batch of images.

24. The system of claim 23, wherein the first group of layers processes the first image and the second image, the second group of layers receives the first image after the first image has been processed by the first group of layers and not the second image after the second image has been processed by the first group of layers, and the third group of layers receives the second image after the second image has been processed by the first group of layers and not the first image after the first image has been processed by the first group of layers.

25. The system of claim 19, further comprising a video capture device configured to:
capture first and second video frames;
generate the first and second images as portions of the first and second video frames, respectively; and
send the first and second images to the first group of layers.

26. The system of claim 25, wherein the first and second CNNs run on the video capture device.

27. The system of claim 25, wherein the first and second images are sent from the video capture device to a server on which the first and second CNNs run.

28. A non-transitory computer readable medium having stored thereon computer program code that is executable by the processor and that, when executed by the processor, causes the processor to perform a method comprising:
processing a first batch of data using a first convolutional neural network (CNN), the first CNN comprising a first group of layers connected in series with a second group of layers, wherein the first batch of data is input to the first CNN via the first group of layers; and
processing a second batch of data using a second CNN, the second CNN comprising the first group of layers connected in series with a third group of layers, wherein the second batch of data is input to the second CNN via the first group of layers,
wherein the first batch of data comprises a first image and the second batch of data comprises a second image, and
wherein the first CNN performs a first task comprising generating a feature vector identifying a first type of object depicted in the first image, and the second CNN performs a second task comprising generating a feature vector identifying a second and different type of object depicted in the second image.

* * * * *